United States Patent
Sun et al.

(10) Patent No.: US 10,212,455 B2
(45) Date of Patent: Feb. 19, 2019

(54) IMAGE CODING METHOD AND IMAGE CODING APPARATUS

(71) Applicant: SUN PATENT TRUST, New York, NY (US)

(72) Inventors: Hai Wei Sun, Singapore (SG); Yi Xuan Zhang, Singapore (SG); Chong Soon Lim, Singapore (SG); Toru Matsunobu, Osaka (JP); Toshiyasu Sugio, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 14/708,373

(22) Filed: May 11, 2015

(65) Prior Publication Data
US 2015/0245070 A1  Aug. 27, 2015

Related U.S. Application Data

(63) Continuation of application No. PCT/JP2014/002657, filed on May 21, 2014.

(30) Foreign Application Priority Data

Jul. 31, 2013  (JP) ................... 2013-159644

(51) Int. Cl.
*H04N 19/61* (2014.01)
*H04N 19/119* (2014.01)
(Continued)

(52) U.S. Cl.
CPC .......... *H04N 19/61* (2014.11); *H04N 19/119* (2014.11); *H04N 19/122* (2014.11);
(Continued)

(58) Field of Classification Search
CPC ..................... H04N 19/122; H04N 19/119
See application file for complete search history.

(56) References Cited

U.S. PATENT DOCUMENTS

2005/0100236 A1   5/2005  Kong et al.
2011/0243226 A1*  10/2011 Choi ............... H04N 19/91
                                                    375/240.12
(Continued)

FOREIGN PATENT DOCUMENTS

| JP | 2006-148878 | 6/2006 |
| WO | 2012/023796 | 2/2012 |
| WO | 2013/046586 | 4/2013 |

OTHER PUBLICATIONS

International Search Report of PCT application No. PCT/JP2014/002657 dated Aug. 5, 2014.
(Continued)

*Primary Examiner* — Thai Q Tran
*Assistant Examiner* — Sunghyoun Park
(74) *Attorney, Agent, or Firm* — Greenblum & Bernstein, P.L.C.

(57) ABSTRACT

Image coding systems in recent years support a plurality of partitions about a transform unit size, prediction unit size, and coding unit size, which are processing units of transform, prediction, and coding, respectively. That is, combination of respective unit sizes is diverse. The present disclosure provides a method and apparatus for reducing a candidate number of partition sizes in an image and for reducing complexity in image coding by determining transform unit sizes and by setting prediction unit sizes and coding unit sizes based on the determined transform unit sizes.

2 Claims, 25 Drawing Sheets

(51) Int. Cl.
*H04N 19/136* (2014.01)
*H04N 19/124* (2014.01)
*H04N 19/176* (2014.01)
*H04N 19/50* (2014.01)
*H04N 19/91* (2014.01)
*H04N 19/70* (2014.01)
*H04N 19/122* (2014.01)

(52) U.S. Cl.
CPC ......... *H04N 19/124* (2014.11); *H04N 19/136* (2014.11); *H04N 19/176* (2014.11); *H04N 19/50* (2014.11); *H04N 19/70* (2014.11); *H04N 19/91* (2014.11)

(56) References Cited

U.S. PATENT DOCUMENTS

| | | | |
|---|---|---|---|
| 2012/0163455 A1* | 6/2012 | Zheng | H04N 19/176 375/240.13 |
| 2012/0177116 A1* | 7/2012 | Panusopone | H04N 19/159 375/240.12 |
| 2012/0230411 A1* | 9/2012 | Liu | H04N 19/176 375/240.16 |
| 2013/0003855 A1* | 1/2013 | Park | H04N 19/119 375/240.18 |
| 2013/0077694 A1 | 3/2013 | Terada et al. | |
| 2013/0136175 A1* | 5/2013 | Wang | H04N 19/00781 375/240.12 |
| 2013/0148739 A1 | 6/2013 | Lee et al. | |
| 2013/0177079 A1* | 7/2013 | Kim | H04N 19/00569 375/240.12 |
| 2013/0188694 A1* | 7/2013 | Lou | H04N 19/13 375/240.03 |

OTHER PUBLICATIONS

"High efficiency video coding", Series H: Audiovisual and Multimedia Systems, Infrastructure of audio visual services—Coding of moving video, Recommendation ITU-T. H.265, Apr. 2013.

* cited by examiner

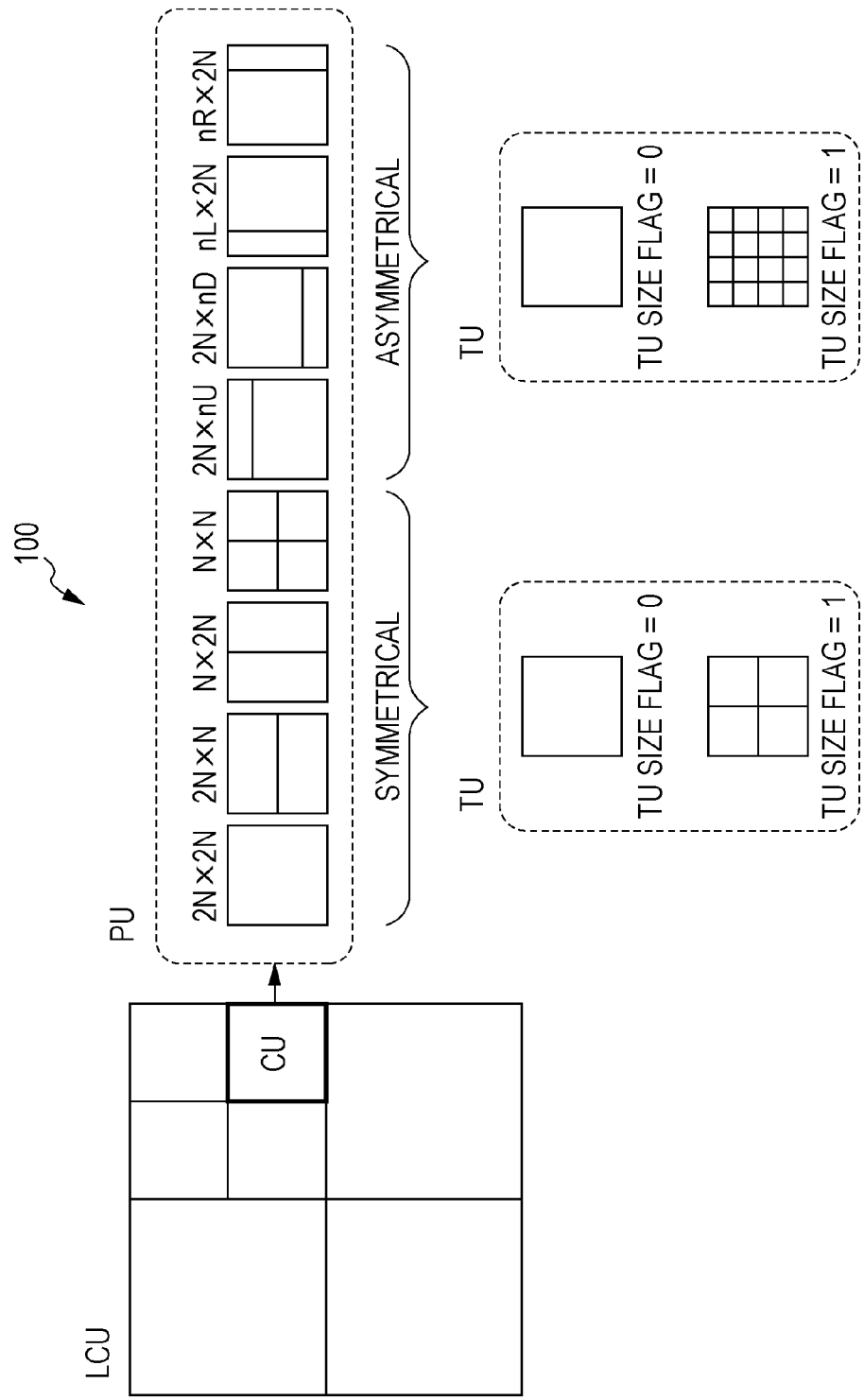

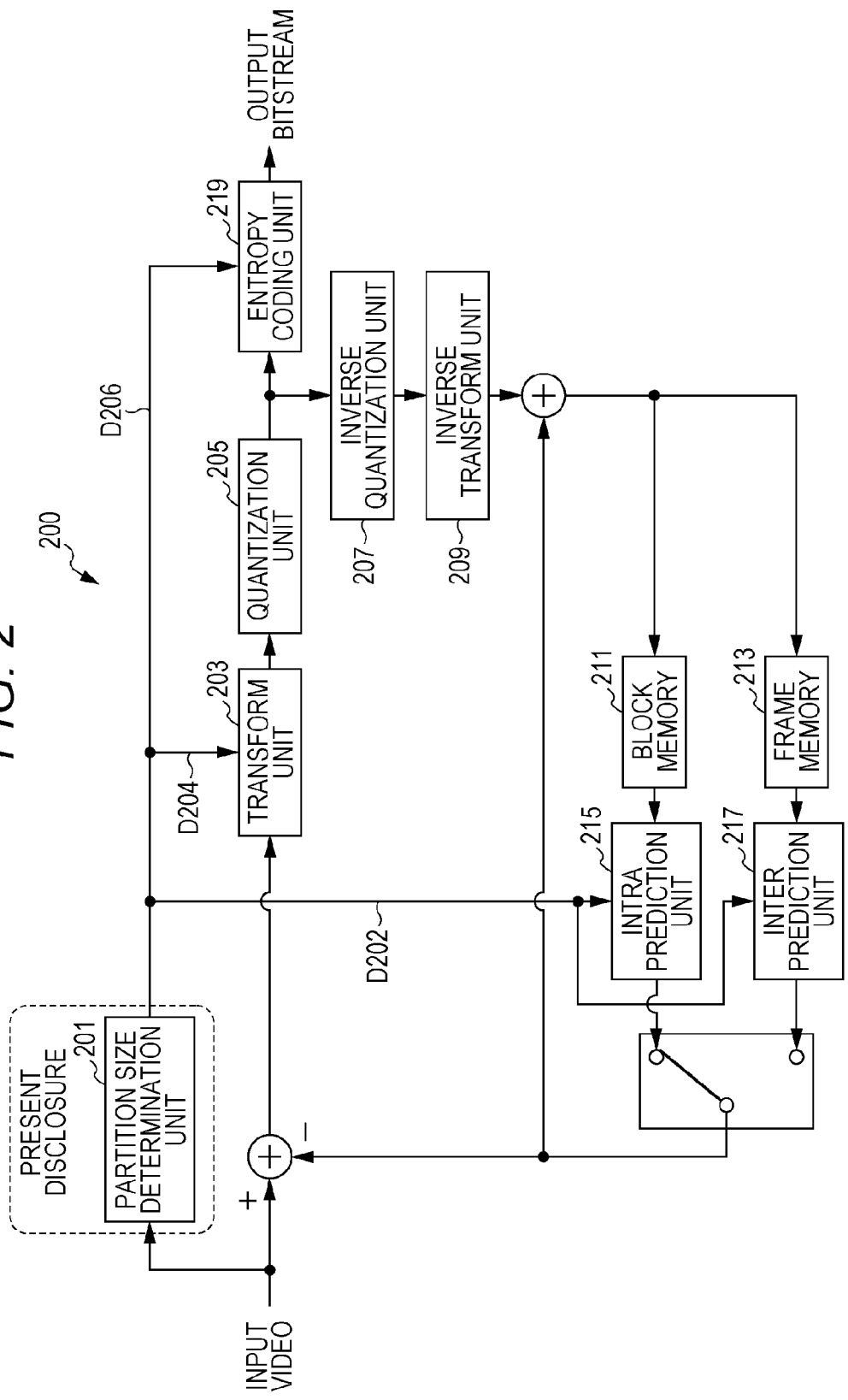

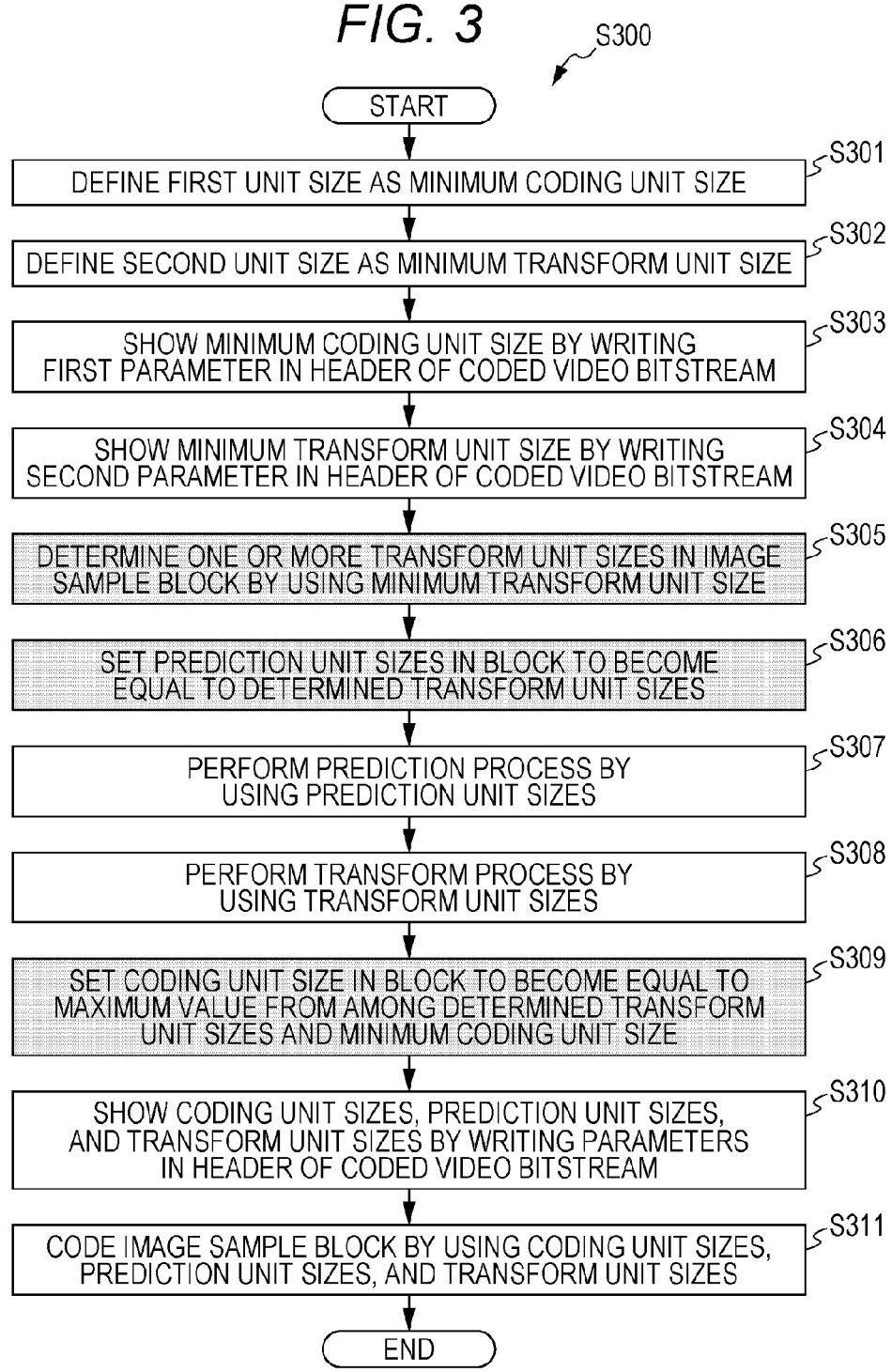

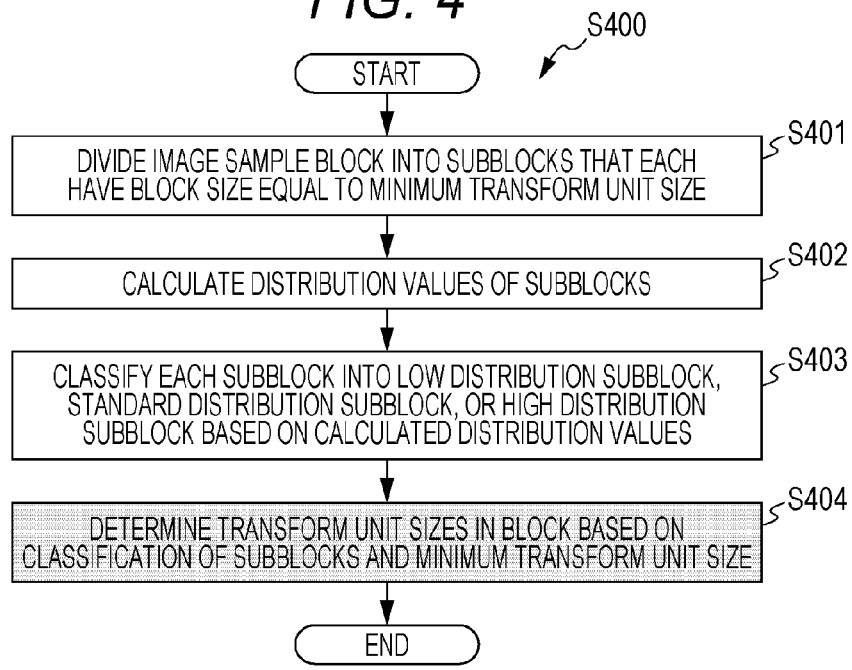
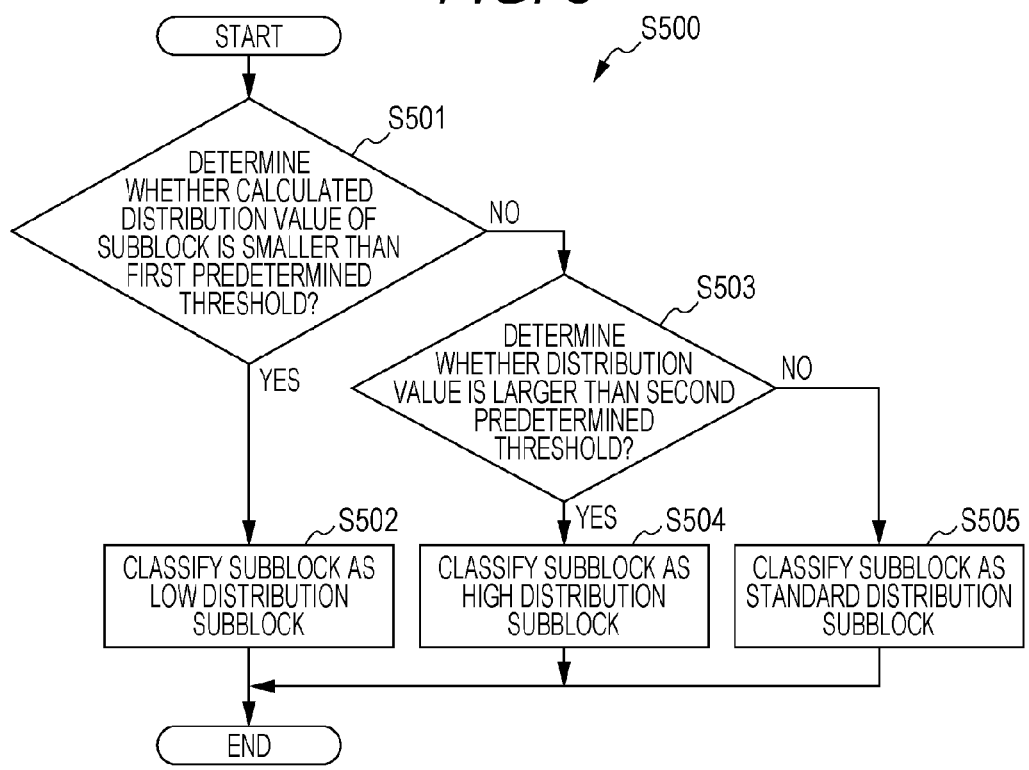

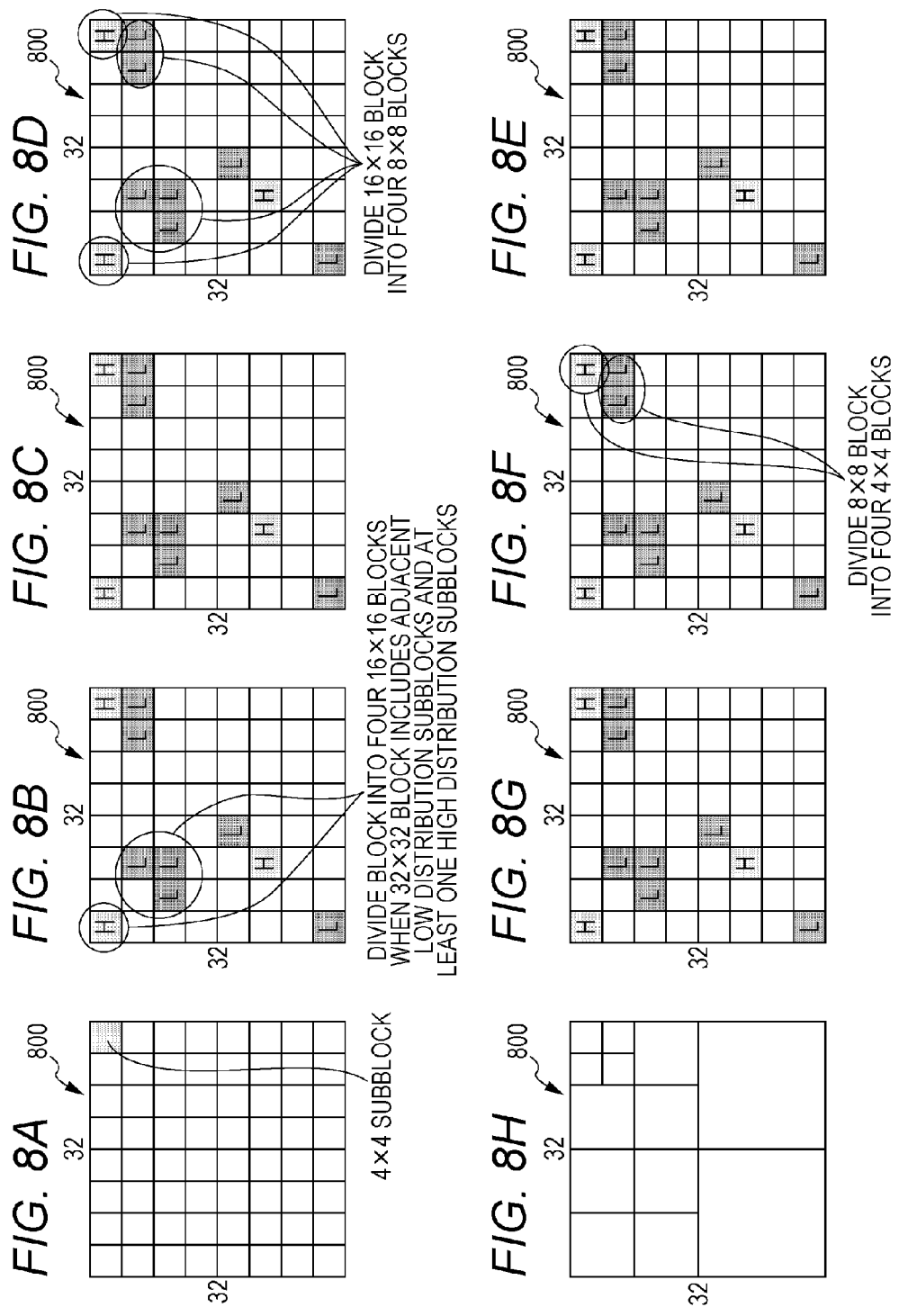

TU SIZES

PU SIZES

CU SIZES

8×8
(WHEN MINIMUM
CU SIZE IS 8×8)

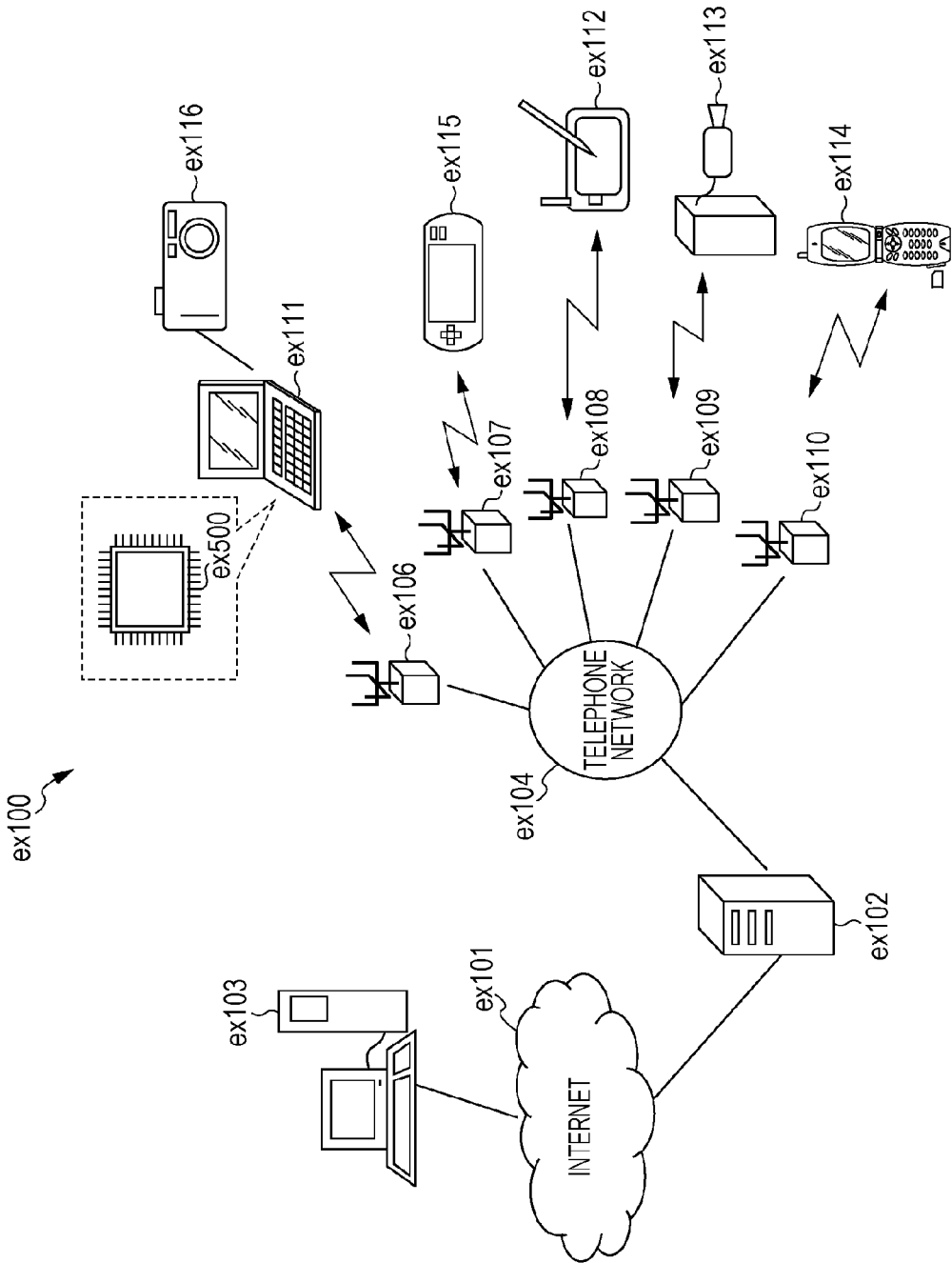

*FIG. 16*

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB VIDEO) |
| VIDEO STREAM (PID = 0x1B01 SUB VIDEO) |

FIG. 19
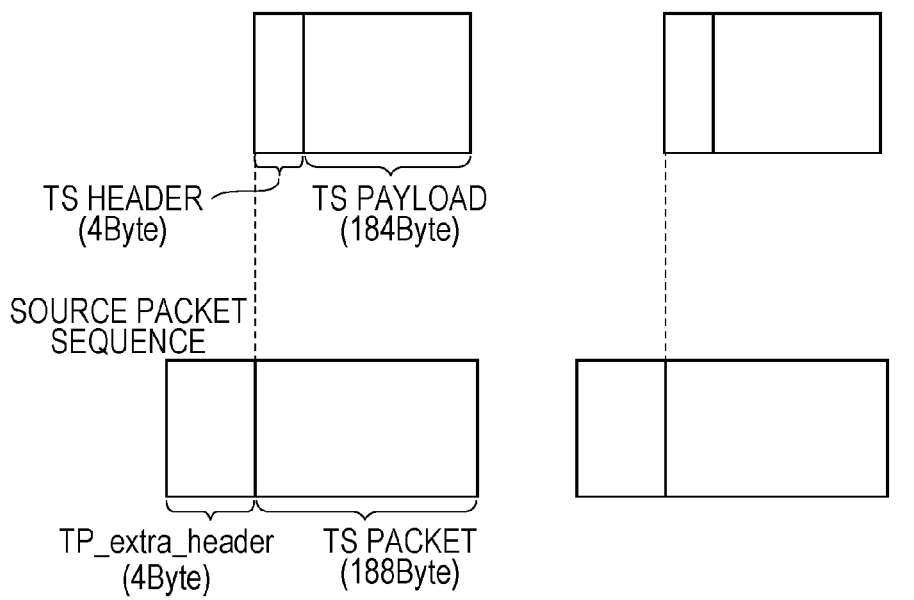
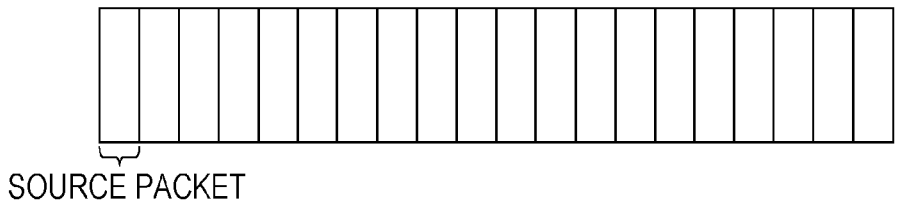

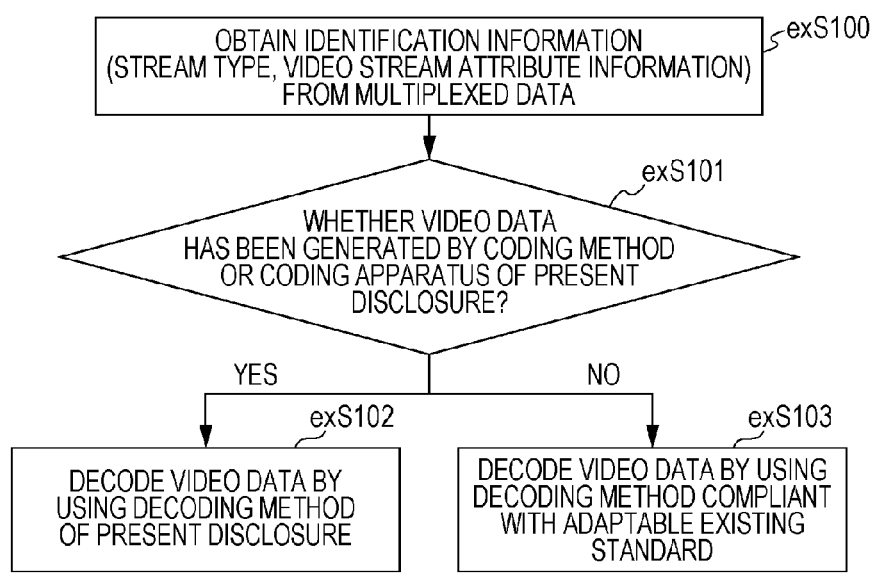

| CONFORMING STANDARD | DRIVING FREQUENCY |
|---|---|
| MPEG4.AVC | 500MHz |
| MPEG2 | 350MHz |
| ⋮ | ⋮ | ex900 ex901 — DECODING PROCESSING UNIT DEDICATED TO PRESENT DISCLOSURE ex902 — DECODING PROCESSING UNIT COMMON TO PRESENT DISCLOSURE AND EXISTING STANDARD

IMAGE CODING METHOD AND IMAGE CODING APPARATUS

BACKGROUND OF THE INVENTION

1. Field of the Invention

The present disclosure relates to a video/image coding method and a video/image coding apparatus. More particularly, the present disclosure relates to a low-complexity video/image coding method and video/image coding apparatus for achieving high-speed multimedia coding by determining sizes of a coding unit (CU), a prediction unit (PU), and a transform unit (TU) adaptively.

2. Description of the Related Art

Latest image coding schemes, such as H.265/HEVC (High Efficiency Video Coding), are intended for a plurality of coding unit (CU) sizes, a plurality of prediction unit (PU) sizes, and a plurality of transform unit (TU) sizes. High compression efficiency is achieved by selecting a best combination that minimizes rate distortion costs from among these CU sizes, PU sizes, and TU sizes. More particularly, as illustrated in FIG. 1, in each coding block, the HEVC specification supports a coding block size mode of from 128×128 (that is, 128-pixel breadth×128-pixel length) to 8×8 (that is, 8-pixel breadth×8-pixel length), a transform block size mode of from 32×32 (that is, 32-pixel breadth×32-pixel length) to 4×4 (that is, 4-pixel breadth×4-pixel length), and a prediction block partition mode of up to eight.

CITATION LIST

Non-Patent Literature

NPL 1: H.265 (ISO/IEC23008-2HEVC)

SUMMARY OF THE INVENTION

An aspect of the present disclosure provides an image coding method including:

a definition step of defining a first unit size as a minimum coding unit size;

a definition step of defining a second unit size as a minimum transform unit size;

a writing step of showing the minimum coding unit size by writing a first parameter in a header of a coded image bitstream;

a writing step of showing the minimum transform unit size by writing a second parameter in the header of the coded image bitstream;

a determination step of determining one or more transform unit sizes in an image sample block by using the minimum transform unit size;

a setting step of setting prediction unit sizes in the image sample block to become equal to the determined transform unit sizes;

a prediction process execution step of executing a prediction process by using the prediction unit sizes;

a transform process execution step of executing a transform process by using the transform unit sizes;

a setting step of setting the coding unit sizes in the image sample block to become equal to a maximum value from among the determined transform unit sizes and the minimum coding unit size;

a writing step of showing the coding unit sizes, the prediction unit sizes, and the transform unit sizes by writing the plurality of parameters in the header of the coded image bitstream; and a coding step of coding the image sample block by using the coding unit sizes, the prediction unit sizes, and the transform unit sizes.

This configuration reduces a total number of combination candidates of the CU sizes, PU sizes, and TU sizes, and thus makes it possible to reduce an amount of processing in intra prediction.

BRIEF DESCRIPTION OF DRAWINGS

FIG. 1 is a diagram illustrating an example of a coding unit (CU) size, a prediction unit (PU) size, and a transform unit (TU) size in a largest coding unit (LCU) in the related art;

FIG. 2 is a block diagram illustrating a structure of a video/image coding apparatus according to the present disclosure;

FIG. 3 is a flowchart of a coding process according to the present disclosure;

FIG. 4 is a flowchart illustrating a process of determining one or more transform unit sizes in an image block according to the present disclosure;

FIG. 5 is a flowchart illustrating a process of classifying each subblock based on a calculated distribution value according to the present disclosure;

FIGS. 8A to 8H are diagrams each illustrating an example of determination of the transform unit sizes in the image block based on the subblock classification and the minimum transform unit size according to the present disclosure;

FIG. 10 is a diagram illustrating the overall configuration of a content providing system that implements content distribution services;

FIG. 16 is a diagram illustrating a structure of multiplexed data;

FIG. 19 is a diagram illustrating structures of a TS (Transport Stream) packet and a source packet in multiplexed data;

FIG. 22 is a diagram illustrating an internal structure of stream attribute information;

FIG. 23 is a diagram illustrating steps for identifying video data.

DETAILED DESCRIPTION OF THE PREFERRED EMBODIMENTS

Findings Underlying the Present Disclosure

Figure 6:
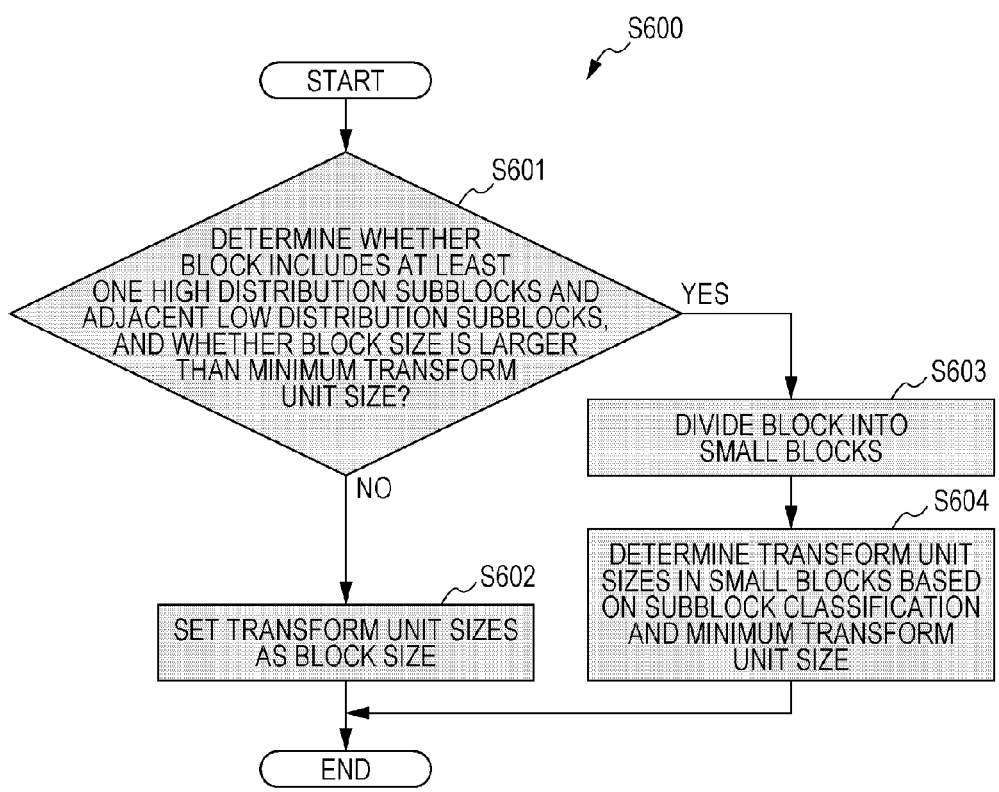
FIG. 6 is a flowchart illustrating a process of determining the transform unit sizes in the image block based on subblock classification and a minimum transform unit according to the present disclosure.

There are many combinations of selectable coding unit (CU) sizes, prediction unit (PU) sizes, and transform unit (TU) sizes in latest image coding schemes, such as H.265/HEVC (High Efficiency Video Coding).

The large TU size like 32×32 is suitable for increasing coding efficiency. When a block contains a strong high-frequency signal, however, undesirable spatial noise occurs by quantization (for example, ringing artifact). In this case, in order to limit a range of the noise, a small transform size is preferred. Therefore, in order to increase the coding efficiency, it becomes important to determine an adaptive TU size. In contrast, each transform size may be evaluated to determine the transform size that is most suitable for increasing the coding efficiency. However, since there are an enormous number of determination paths related to the evaluation in the combinations of all the selectable PU sizes and CU sizes, an amount of processing becomes very large.

In this way, it is too complicated to test all the possible combinations of the TU sizes, PU sizes, and CU sizes for reducing the amount of processing and accelerating the processing. However, if a method is used to limit a maximum value of the TU sizes, or a maximum value of the combination of the CU sizes, PU sizes, and TU sizes, and to reduce complexity of determination in a coding apparatus, there is a possibility that the coding efficiency is significantly decreased.

An object of the present disclosure is to solve the above-described problem. The following describes details.

First Exemplary Embodiment

FIG. 2 is a block diagram illustrating a structure of video/image coding apparatus 200 according to the present disclosure.

Video/image coding apparatus 200 is an apparatus for coding an input video/image bitstream on a block-by-block basis to generate a coded output bitstream. As illustrated in FIG. 2, video/image coding apparatus 200 includes partition size determination unit 201, transform unit 203, quantization unit 205, inverse quantization unit 207, inverse transform unit 209, block memory 211, frame memory 213, intra prediction unit 215, inter prediction unit 217, and entropy coding unit 219.

An input video/image is input from the video/image bitstream into partition size determination unit 201 and an adder on a pictures-by-pictures basis, on a picture-by-picture basis, on a slice-by-slice basis, or the like. Partition size determination unit 201 determines a set of the CU sizes, PU sizes, and TU sizes in a unit of the input video/image. Details will be described later with reference to FIG. 3. Subsequently, partition size determination unit 201 outputs TU-size data D204 to transform unit 203, PU-size data D202 to intra prediction unit 215 and inter prediction unit 217, and CU-size, PU-size, and TU-size data D206 to entropy coding unit 219, respectively.

An additional value from the adder is output to transform unit 203. Transform unit 203 transforms the additional value into a frequency coefficient by using the TU size specified with TU-size data D204 from partition size determination unit 201, and outputs the obtained frequency coefficient to quantization unit 205. Quantization unit 205 quantizes the input frequency coefficient, and outputs an obtained quantized value to inverse quantization unit 207 and entropy coding unit 219.

Processing of transform unit 203 and quantization unit 205 may be sequentially executed in each unit on a TU-by-TU basis, or may be collectively executed by using multiplication of one or more matrices that have coefficients corresponding to the TU size. Quantization may be represented in terms such as scaling or rounding.

Entropy coding unit 219 codes the quantized value from quantization unit 205 in the same way as CU-size, PU-size, and TU-size data D206 from partition size determination unit 201, and outputs a bitstream.

Inverse quantization unit 207 performs inverse quantization on the quantized value that is output from quantization unit 205, and outputs the frequency coefficient to inverse transform unit 209. Inverse transform unit 209 performs inverse frequency transform on the frequency coefficient, transforms the frequency coefficient into a bitstream sample value, and outputs the obtained sample value to an adder. The adder adds the bitstream sample value that is output from inverse transform unit 209 to a prediction video value/prediction image value that are output from intra prediction unit 215/inter prediction unit 217, respectively, and outputs obtained additional values to block memory 211 or frame memory 213 for further prediction.

Processing of inverse quantization unit 207 and inverse transform unit 209 may be sequentially executed on a TU-by-TU basis, or may be collectively executed by using multiplication of one or more matrices that have coefficients corresponding to the TU size. Here, terms "inverse quantization" and "inverse transform" are used for clear description. However, "inverse quantization" and "inverse transform" may be similarly referred to as "quantization" and "transform" because "inverse quantization" and "inverse transform" are each processing that uses multiplication of matrices with a difference only in a coefficient value from "quantization" and "transform", respectively.

Intra prediction unit 215 performs a search in the reconfigured video/image that are retained in block memory 211 for each PU specified with PU-size data D202 from partition size determination unit 201, and copies part of the searched video/image, or performs multiplication for weighting. Thereby, intra prediction unit 215 creates a prediction video/prediction image corresponding to the applicable PU, that is, the video/image predicted to be similar to the applicable PU of the input video/image. Inter prediction unit 217 performs a search in the reconfigured video/image that are retained in frame memory 213 for each PU specified with PU-size data D202 from partition size determination unit 201, and detects one or more videos/images that are most similar to or that have a high possibility of being similar to the applicable PU of the input video/image as the prediction video/image corresponding to the applicable PU.

FIG. 3 illustrates a flowchart of video/image coding process according to the present disclosure. All the unit sizes described below are shown by pixel breadth×pixel length (for example, M×N), and the pixel breadth may be identical to or different from the pixel length.

In step S301, a first unit size is defined as a minimum coding unit size. For example, the first unit size is 8×8 (that is, 8-pixel breadth×8-pixel length, in which M=N=8).

In step S302, a second unit size is defined as a minimum transform unit size. For example, the second unit size is 4×4 (that is, 4-pixel breadth×4-pixel length, in which M=N=4).

Figure 7:
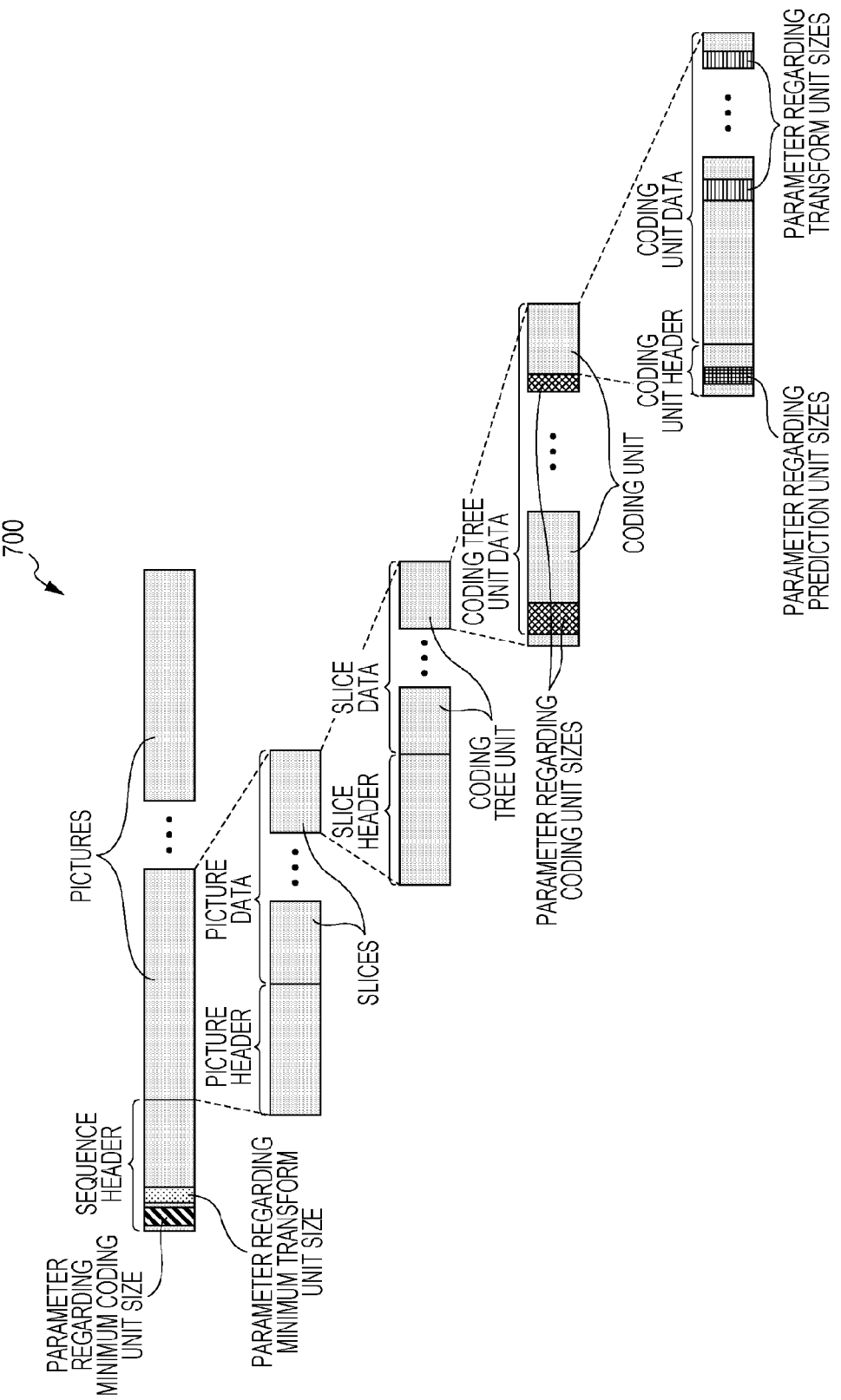
FIG. 7 is a syntax diagram illustrating an example of arrangement of parameters regarding a minimum coding unit size, a minimum transform unit size, coding unit sizes, prediction unit sizes, and the transform unit sizes.

In step S303, a first parameter that shows the minimum coding unit size is written in a header of a coded bitstream. Specifically, the first parameter is located in a sequence header of a sequence that includes one or more coded pictures, as illustrated in FIG. 7.

In step S304, a second parameter that shows the minimum transform unit size is written in the header of the coded bitstream. Specifically, the second parameter is located in the sequence header of the sequence, as illustrated in FIG. 7.

In step S305, one or more transform unit sizes are determined in an image block within the picture such that the transform unit sizes each become a size equal to or greater than the minimum transform unit size. Details will be illustrated in FIGS. 4, 5, and 6.

Figure 9A:
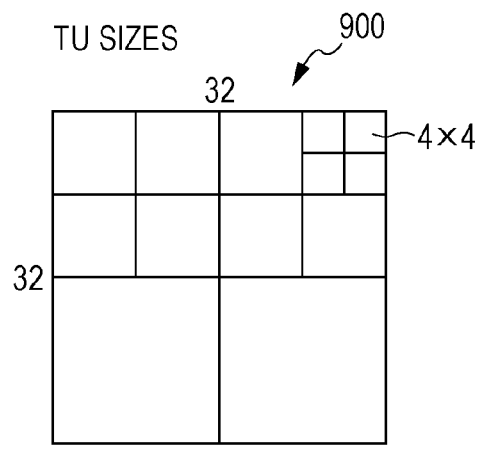
FIGS. 9A to 9C are diagrams each illustrating an example of setting the prediction unit sizes and the coding unit sizes by using the transform unit sizes determined in the block according to the present disclosure.
Figure 9B:
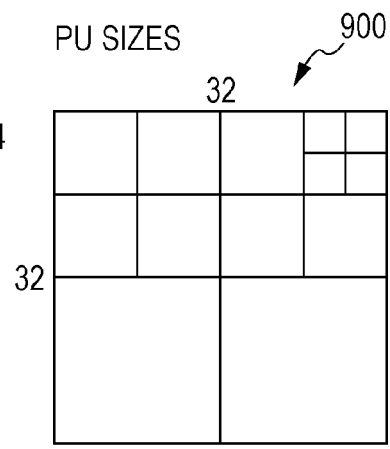
Figure 9C:
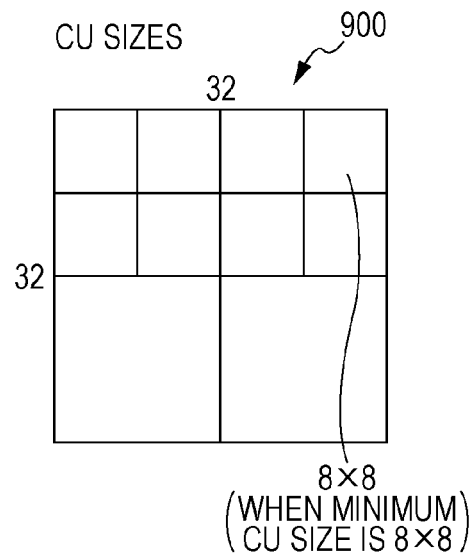

In step S306, prediction unit sizes are set to become equal to the transform unit sizes determined in S305 in the image block. FIGS. 9A to 9C each illustrate an example. FIG. 9A illustrates the determined transform unit sizes, and FIG. 9B illustrates the prediction unit sizes that are equal to the transform unit sizes determined in S305.

In step S307, a prediction process is performed by using the prediction unit sizes.

In step S308, a transform process is performed by using the transform unit sizes.

In step S309, the coding unit size is set in the block to become equal to a maximum value from among the transform unit sizes determined in S305 and the minimum coding unit size. FIGS. 9A to 9C each illustrate an example. FIG. 9A illustrates the determined transform unit sizes, and FIG. 9C illustrates the coding unit sizes that are equal to the transform unit sizes determined in S305, except for the coding unit located in an upper right corner. Since the minimum coding unit size is larger than the corresponding transform unit sizes, the size of the coding unit located in the upper right corner is set to the minimum coding unit size specified in step S301, not to the corresponding transform unit sizes.

In step S310, the coding unit sizes, the prediction unit sizes, and the transform unit sizes are shown by the plurality of parameters being written in the header of the coded bitstream. Processing of steps S303 and S304 may be performed together in step S310. That is, the first parameter and the second parameter may be written in the header of the coded bitstream in step S310.

FIG. 7 is a syntax diagram illustrating positions of the parameters regarding the minimum coding unit size, the minimum transform unit size, the coding unit sizes, the prediction unit sizes, and the transform unit sizes in typical implementation of the present disclosure.

As illustrated in FIG. 7, the first parameter is located in the sequence header of the sequence (step S303 of FIG. 3). The second parameter is located in the sequence header of the sequence (step S304 of FIG. 3). The coding unit sizes are located in coding tree unit data of slice data (step S310 of FIG. 3). The prediction unit sizes are located in coding unit headers of the coding tree unit data of the slice data (step S310 of FIG. 3). The transform unit sizes are located in coding unit data of the coding tree unit data of the slice data (step S310 of FIG. 3).

Processing of S305 will be described in detail below with reference to FIGS. 4, 5, and 6.

FIG. 4 is a flowchart illustrating a process of determining the one or more transform unit sizes in the image block by using the minimum transform unit size according to the present disclosure.

In step S401, the image block is divided into a plurality of subblocks that each have a block size equal to the minimum transform unit size. In step S402, a distribution value of each of the subblocks is calculated. Examples of the expression of calculating the distribution value of the subblock include $$\times \frac{1}{n}\sum_{i=1}^{n}(x_i - \mu),$$

where $\mu$ is an average pixel value of the subblock, $x_i$ is one of the pixel values of the subblock, and n is a total pixel number of the subblock.

In step S403, each of the subblocks is classified into a plurality of categories based on the calculated distribution value. As the plurality of categories, each of the subblocks is classified into, for example, a low distribution subblock, a standard distribution subblock, or a high distribution subblock. Details will be described later with reference to FIG. 5. Finally, in step S404, the transform unit sizes in the block are determined based on classification of the subblock and the minimum transform unit size.

FIG. 5 is a flowchart illustrating classification of the subblock into the low distribution subblock, the standard distribution subblock, or the high distribution subblock.

In step S501, it is determined whether the calculated distribution value of the subblock is smaller than a first predetermined threshold. When it is determined that the distribution value is smaller than the first predetermined threshold, the processing proceeds to step S502; otherwise, the processing proceeds to step S503. In step S502, the subblock is classified as the low distribution subblock. In step S503, it is determined whether the distribution value is larger than a second predetermined threshold. When it is determined that the distribution value is larger than the second predetermined threshold, the processing proceeds to step S504; otherwise, the processing proceeds to step S505. Here, the second predetermined threshold is larger than the first predetermined threshold. In step S504, the subblock is classified as the high distribution subblock. In step S505, the subblock is classified as the standard distribution subblock. While classification to three types of categories is illustrated here as the classification to the plurality of categories, the classification may be any classification to two or more types of categories. The thresholds and the comparison flow may be suitably set in accordance with a number of categories.

FIG. 6 is a flowchart illustrating a process of determining the transform unit sizes in the block based on the subblock classification and the minimum transform unit according to the present disclosure.

In step S601, it is determined whether the block includes both at least one high distribution subblock and the plurality of adjacent low distribution subblocks, and whether the size of the block is larger than the minimum transform unit size. Here, the adjacent low distribution subblocks are described such that at least two low distribution subblocks are in contact with each other in a horizontal direction, in a vertical direction, or in an oblique direction. When a determination result is YES, the processing proceeds to step S603; otherwise, the processing proceeds to step S602. In step S602, the transform unit sizes are set as the size of the block. In step S603, the block is divided into a plurality of small blocks. In step S604, the transform unit sizes in the small blocks are determined based on the classification of the subblocks and the minimum transform unit size.

FIGS. 8A to 8H each illustrate an example of the process. FIG. 8A illustrates 32×32 (that is, 32-pixel breadth×32-pixel length) blocks, and the sizes of the CU, PU, and TU are determined by using a method according to the present disclosure. The size of the subblock is 4×4 (that is, 4-pixel breadth×4-pixel length). The first unit size as the minimum coding unit size is 8×8 (that is, 8-pixel breadth×8-pixel length). The second unit size as the minimum transform unit size is 4×4 (that is, 4-pixel breadth×4-pixel length). In FIG. 8B, distribution of each subblock is calculated by using the first predetermined threshold in step S501 and the second predetermined threshold in step S503, and each subblock is classified into the high distribution subblock (illustrated as "H") and the low distribution subblock (illustrated as "L"). In this example, at least one high distribution subblock and the plurality of adjacent low distribution subblocks are highlighted by a circle. In contrast, the size of an object block of 32×32 is larger than the minimum transform unit size of 4×4. Here, the object block is divided into four blocks that each have the size of 16×16, as illustrated in FIG. 8C. After division, at least one high distribution subblock and the plurality of adjacent low distribution subblocks are found only in two upper blocks as highlighted by the circle in FIG. 8D. Since the size of 16×16 of two upper blocks is larger than the size of 4×4 of the minimum transform unit, the two upper blocks are each further divided into four blocks that each have the size of 8×8. Two lower blocks, which do not to satisfy conditions of step S601, are not further divided. FIG. 8E illustrates a result of division. In these 8×8 blocks, at least one high distribution subblock and the plurality of adjacent low distribution subblocks are found only in the upper right blocks, and are highlighted by a circle in FIG. 8F. The upper right 8×8 blocks, which each have the size larger than the minimum transform unit size of 4×4, are further divided into four blocks that each have the size of 4×4. However, other 8×8 blocks and 16×16 blocks do not change, as illustrated in FIG. 8G. Since at least one high distribution subblock or the plurality of adjacent low distribution subblocks cannot be confirmed, further division is not performed. As illustrated in FIG. 8H, a final TU partition is determined for these 32×32 blocks.

FIGS. 9A to 9C are diagrams each illustrating an example of setting the prediction unit sizes and the coding unit sizes in the block by using the determined transform unit sizes according to the present disclosure.

FIG. 9A illustrates the determined transform unit sizes. FIG. 9B illustrates the prediction unit sizes that are equal to the determined transform unit sizes (step S306 of FIG. 3). FIG. 9C illustrates the coding unit sizes that are equal to the determined transform unit sizes except for the coding units located in the upper right corner. Since the minimum coding unit size is larger than the corresponding transform unit sizes, the size of the coding unit located in the upper right corner is set to the minimum coding unit size specified in step S301, not to the corresponding transform unit sizes (step S309 of FIG. 3).

Figure 29:
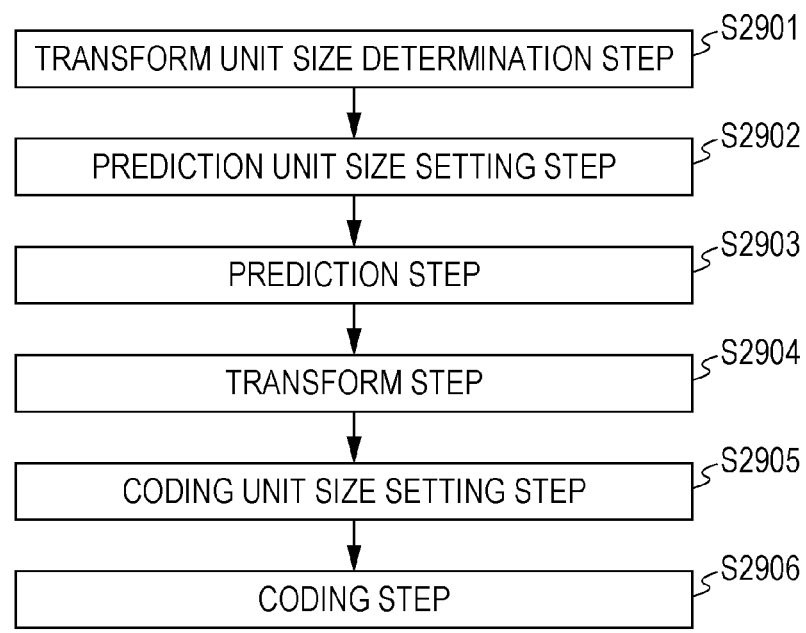
FIG. 29 is a flowchart illustrating an outline of the coding process.

FIG. 29 is a flowchart illustrating an outline of the coding process according to the present disclosure.

Step S2901 is a transform unit size determination step of determining one or more transform unit sizes in the block that forms an image to be equal to or greater than the preset minimum transform unit size. Step S2902 is a prediction unit size setting step of setting one or more prediction unit sizes in the block to be equal to the determined one or more transform unit sizes, respectively. Step S2903 is a prediction step of predicting the block on a prediction unit-by-prediction unit basis determined by using the prediction unit sizes to generate a prediction block. Step S2904 is a transform step of transforming a difference between the block and the prediction block on a transform unit-by-transform unit basis determined by using the transform unit sizes. Step S2905 is a coding unit size setting step of setting one or more coding unit sizes in the block to be equal to the determined one or more transform unit sizes, respectively. In the coding unit size setting step, when the transform unit includes a first transform unit that is smaller than the preset minimum coding unit size, the size of the first coding unit including the first transform unit is set to the preset minimum coding unit size. Step S2906 is a coding step of coding the transformed block on a coding unit-by-coding unit basis determined by using the coding unit sizes to generate a bitstream.

As described above, the present disclosure makes it possible to reduce the amount of processing in partition size determination.

Second Exemplary Embodiment

The processes described in the embodiment above can be implemented easily in a standalone computer system by recording a program for implementing the configuration of a video coding method (image coding method) or video decoding method (image decoding method) described in the embodiment on a storage medium. The storage medium may be any given type of medium capable of storing the program, such as a magnetic disk, an optical disc, a magneto-optical disk, an IC (Integrated Circuit) card, or a semiconductor memory.

Now, exemplary applications of the video coding method (image coding method) or the video decoding method (image decoding method) described in the embodiment and systems using them will be further described. The systems include an image coding/decoding apparatus which includes an image coding apparatus that employs the image coding method and an image decoding apparatus that employs the image decoding method. Other configurations of the systems can be changed as appropriate in accordance with the circumstances.

FIG. 10 is a diagram illustrating an overall configuration of a content providing system ex100 that implements content distribution services. An area in which communication services are provided is divided into cells of a desired size. Base stations ex106, ex107, ex108, ex109, and ex110, which are fixed wireless stations, are installed in the respective cells.

In this content providing system ex100, various devices, such as a computer ex111, a PDA (Personal Digital Assistant) ex112, a camera ex113, a mobile phone ex114, a game machine ex115 are connected to Internet ex101 via an Internet service provider ex102, a telephone network ex104, and the base stations ex106 to ex110.

Note that the configuration of the content providing system ex100 is not limited to the configuration illustrated in FIG. 10, and any given combination of the elements may be connected. Also, the individual devices may be directly connected to the telephone network ex104 instead of via the base stations ex106 to ex110 which are fixed wireless stations. Alternatively, the individual devices may be directly interconnected via near field communication or the like.

The camera ex113 is a device capable of capturing moving images, such as a digital camcorder. A camera ex116 is a device capable of capturing still images and moving images, such as a digital camera. Also, the mobile phone ex114 may be any of a mobile phone based on the GSM (registered trademark) (Global System for Mobile Communications) scheme, CDMA (Code Division Multiple Access) scheme, W-CDMA (Wideband-Code Division Multiple Access) scheme, LTE (Long Term Evolution) scheme, or HSPA (High Speed Packet Access) scheme; a PHS (Personal Handyphone System); and so forth.

In the content providing system ex100, the camera ex113 or the like is connected to a streaming server ex103 via the base station ex109 and the telephone network ex104. In this way, live streaming is implemented. During live streaming, the coding process is performed on content (for example, video of a music event) obtained by the user using the camera ex113 in a manner as described in the above-described embodiment (that is, the camera ex113 functions as an image coding apparatus according to one aspect of the present disclosure) and the resulting content is transmitted to the streaming server ex103. The streaming server ex103 in turn distributes the received content as a stream to a client that has made a request. Examples of the client include the computer ex111, the PDA ex112, the camera ex113, the mobile phone ex114, and the game machine ex115 capable of decoding the data that has undergone the coding process. Each device that has received the distributed data performs the decoding process on the received data to reproduce the data (that is, the device functions as an image decoding apparatus according to one aspect of the present disclosure).

Note that the coding process may be performed on the obtained data by the camera ex113, by the streaming server ex103 that performs a data transmission process, or by both of them on a processing-sharing basis. Similarly, the decoding process may be performed on the distributed data by the client, by the streaming server ex103, or by both of them on a processing-sharing basis. Also, in addition to still and/or moving image data obtained by the camera ex113, still and/or moving image data obtained by the camera ex116 may be transmitted to the streaming server ex103 via the computer ex111. In this case, the coding process may be performed by any of the camera ex116, the computer ex111, and the streaming server ex103, or by all of them on a processing-sharing basis.

These coding and decoding processes are performed in general by an LSI ex500 included in the computer ex111 or each device. The LSI ex500 may be formed as a single chip or a plurality of chips. Alternatively, software for video coding/decoding may be recorded on a recording medium (such as a CD-ROM, a flexible disk, or a hard disk) that is readable by the computer ex111 or the like, and the coding and decoding processes may be performed using the software. Further, in the case where the mobile phone ex114 is equipped with a camera, moving image data obtained with the camera may be transmitted. This moving image data is data that has been coded by the LSI ex500 included in the mobile phone ex114.

Also, the streaming server ex103 may be constituted by a plurality of servers or a plurality of computers that process, record, and distribute data in a distributed manner.

In the above-described manner, the content providing system ex100 allows the client to receive and reproduce coded data. Accordingly, the content providing system ex100 allows the client to receive, decode, and reproduce information transmitted by a user in real time, and thus allows a user not having a special right or equipment to implement personal broadcasting.

Figure 11:
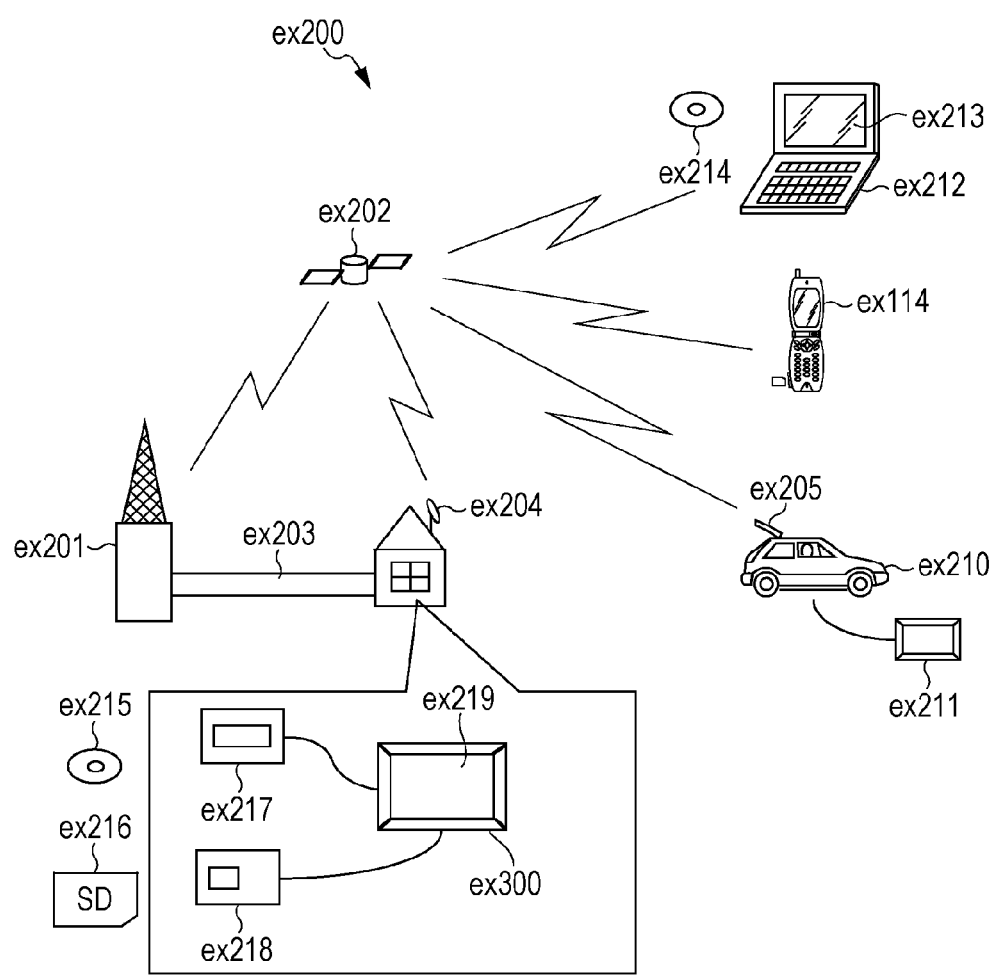
FIG. 11 is a diagram illustrating the overall configuration of a digital broadcasting system.

In addition to the example of the content providing system ex100, at least one of the video coding apparatus (image coding apparatus) and the video decoding apparatus (image decoding apparatus) according to the above-described embodiment can be incorporated in a digital broadcasting system ex200 as illustrated in FIG. 11. Specifically, a broadcasting station ex201 transmits a radio wave of multiplexed data obtained by multiplexing video data, music data, and the like, via communication to a broadcasting satellite ex202. This video data is data coded using the video coding method described in the above-described embodiment (that is, data coded by the image coding apparatus according to one aspect of the present disclosure). Upon receipt of this data, the broadcasting satellite ex202 transmits a broadcasting radio wave, and a home antenna ex204 capable of receiving satellite broadcasting receives this radio wave. An apparatus such as a television (receiver) ex300 or a set top box (STB) ex217 decodes and reproduces the received multiplexed data (that is, the apparatus functions as the image decoding apparatus according to one aspect of the present disclosure).

Also, the video decoding apparatus or the video coding apparatus described in the above-described embodiment can be implemented in a reader/recorder ex218 that reads and decodes the multiplexed data recorded on a recording medium ex215 such as a DVD (Digital Versatile Disc) or a BD (Blu-ray Disc); or that codes a video signal and further multiplexes a music signal with the video signal depending on circumstances, and writes the resulting signal on the recording medium ex215. In this case, the reproduced video signal is displayed on a monitor ex219, and the video signal can be reproduced by another apparatus or system using the recording medium ex215 having the multiplexed data recorded thereon. Alternatively, the video decoding apparatus may be implemented in the set top box ex217 connected to a cable ex203 for cable television or the home antenna ex204 for satellite/terrestrial broadcasting, and the video signal may be displayed on the monitor ex219 of the television ex300. At this time, the video decoding apparatus may be incorporated into the television ex300 instead of the set top box ex217.

Figure 12:
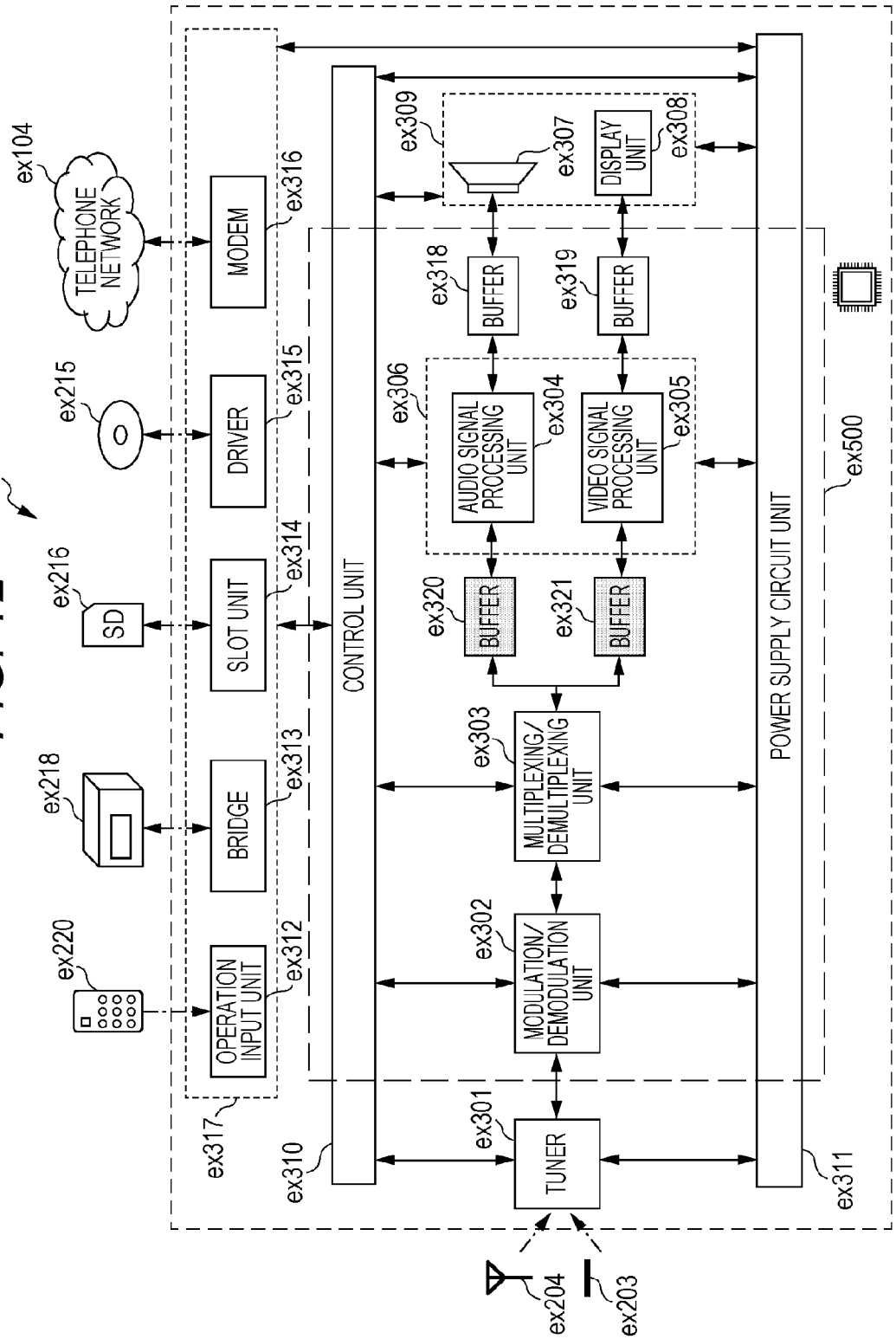
FIG. 12 is a block diagram illustrating an example of a configuration of a television.

FIG. 12 is a diagram illustrating the television (receiver) ex300 that employs the video decoding method and the video coding method described in the embodiment above. The television ex300 includes a tuner ex301 that obtains or outputs, via the antenna ex204 or the cable ex203 that receives broadcasting, multiplexed data in which video data and audio data are multiplexed together; a modulation/demodulation unit ex302 that performs demodulation on the received multiplexed data or modulation on multiplexed data to be transmitted to outside; and a multiplexing/demultiplexing unit ex303 that demultiplexes the demodulated multiplexed data into video data and audio data, or multiplexes video data and audio data that have been coded by a signal processing unit ex306.

The television ex300 also includes the signal processing unit ex306 and an output unit ex309. The signal processing unit ex306 includes an audio signal processing unit ex304 that decodes or codes audio data, and a video signal processing unit ex305 that decodes or codes video data (the video signal processing unit ex305 functions as the image coding apparatus or the image decoding apparatus according to one aspect of the present disclosure). The output unit ex309 includes a speaker ex307 that outputs the decoded audio signal, and a display unit ex308, such as a display, that displays the decoded video signal. The television ex300 further includes an interface unit ex317 which includes an operation input unit ex312 that accepts input of a user operation. The television ex300 further includes a control unit ex310 that controls the individual units in an integrated manner, and a power supply circuit unit ex311 that supplies electric power to the individual units. The interface unit ex317 may include a bridge ex313 to be connected to an external device, such as the reader/recorder ex218; a slot unit ex314 that enables connection of a recording medium ex216 such as an SD card; a driver ex315 for connection to the external recording medium ex215, such as a hard disk; and a modem ex316 for connection to the telephone network ex104 as well as the operation input unit ex312. Note that the recording medium ex216 is capable of electrically storing information by using a nonvolatile/volatile semiconductor memory included therein. The individual units of the television ex300 are connected to one another via a synchronization bus.

First, a configuration that allows the television ex300 to decode and reproduce multiplexed data obtained from outside with the antenna ex204 or the like will be described. The television ex300 receives a user operation from a remote control ex220 or the like. Based on control performed by the control unit ex310 including a CPU or the like, the multiplexing/demultiplexing unit ex303 demultiplexes multiplexed data that has been demodulated by the modulation/demodulation unit ex302. Further, in the television ex300, the audio signal processing unit ex304 decodes the separated audio data and the video signal processing unit ex305 decodes the separated video data by using the image decoding method described in the above embodiment. Further, the decoded audio signal and video signal are output to outside from the output unit ex309. When the audio signal and the video signal are output, these signals may be temporarily stored in buffers ex318 and ex319 or the like so that they are reproduced in synchronization with each other. Also, the television ex300 may read multiplexed data from the recording media ex215 and ex216 such as a magnetic/optical disc and an SD card as well as from broadcasting. Next, a configuration that allows the television ex300 to code an audio signal and a video signal and to transmit the resulting signals to outside or write the resulting signals on a recording medium or the like will be described. The television ex300 receives a user operation from the remote control ex220 or the like. Based on control performed by the control unit ex310, the audio signal processing unit ex304 codes the audio signal, and the video signal processing unit ex305 codes the video signal by using the image coding method described in the above embodiment. The coded audio signal and video signal are multiplexed by the multiplexing/demultiplexing unit ex303 and the resulting multiplexed signal is output to outside. When the audio signal and the video signal are multiplexed, these signals may be temporarily stored in buffers ex320 and ex321 or the like so that they are synchronized with each other. Note that a plurality of buffers may be provided as illustrated as the buffers ex318, ex319, ex320, and ex321; or one or more buffers may be shared. Further, in addition to the illustrated buffers, for example, data may be stored in a buffer that serves as a buffering member for avoiding an overflow or underflow in the system between the modulation/demodulation unit ex302 and the multiplexing/demultiplexing unit ex303 or the like.

The television ex300 may also include a configuration for receiving audio/video input of a microphone or a camera in addition to the configuration for obtaining audio data and video data from broadcasting, a recording medium, or the like; and may perform the coding process on the data obtained therefrom. Although the television ex300 has been described as the configuration capable of performing the above-described coding process, multiplexing, and outputting to outside, the television ex300 may be a configuration incapable of performing these processes and only capable of the reception, decoding process, and outputting to outside.

In the case where multiplexed data is read from and written to a recording medium by the reader/recorder ex218, the decoding process or the coding process may be performed by the television ex300, by the reader/recorder ex218, or by both the television ex300 and the reader/recorder ex218 on a processing-sharing basis.

Figure 13:
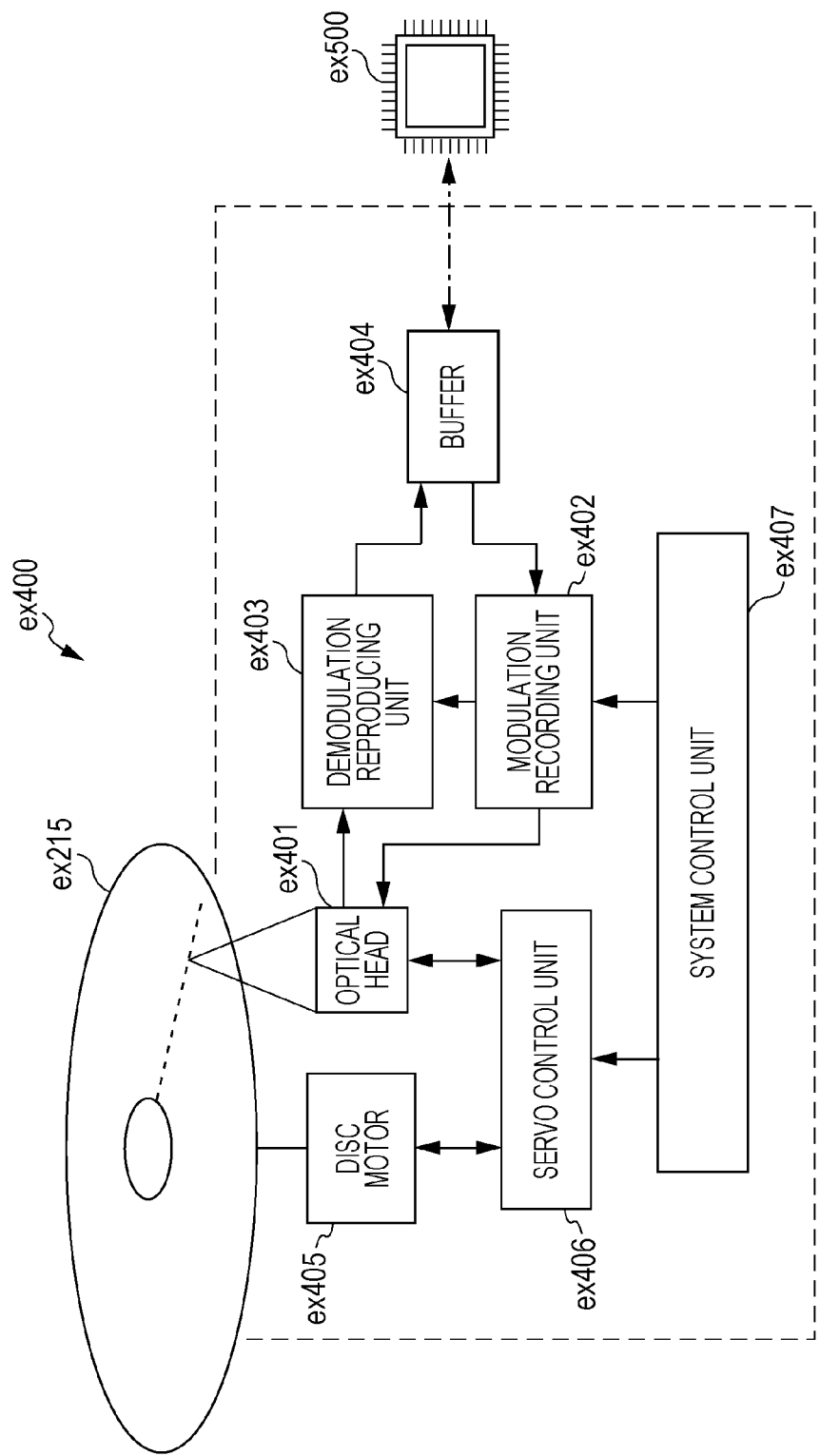
FIG. 13 is a block diagram illustrating an example of a configuration of an information reproducing/recording unit that reads information from and writes information to a recording medium which is an optical disc.

FIG. 13 illustrates an example of a configuration of an information reproducing/recording unit ex400 in the case of reading data from and writing data to an optical disc. The information reproducing/recording unit ex400 includes an optical head ex401, a modulation recording unit ex402, a demodulation reproducing unit ex403, a buffer ex404, a disc motor ex405, a survo control unit ex406, and a system control unit ex407. The optical head ex401 irradiates a recording surface of the recording medium ex215, which is an optical disc, with a laser spot to write information thereon; and detects reflected light from the recording surface of the recording medium ex215 to read information. The modulation recording unit ex402 electrically drives a semiconductor laser included in the optical head ex401 to modulate a laser beam in accordance with to-be-recorded data. The demodulation reproducing unit ex403 amplifies a reproduced signal which is obtained by electrically detecting reflected light from the recording surface by a photodetector included in the optical head ex401, separates and demodulates signal components recorded on the recording medium ex215, and reproduces necessary information. The buffer ex404 temporarily stores information to be recorded on the recording medium ex215 and information reproduced from the recording medium ex215. The disc motor ex405 rotates the recording medium ex215. The survo control unit ex406 moves the optical head ex401 to a certain information track while controlling rotational driving of the disc motor ex405 to perform a laser spot tracking process. The system control unit ex407 controls the information reproducing/recording unit ex400. The above-described reading and writing processes are implemented as a result of the system control unit ex407 performing recording/reproduction of information via the optical head ex401 while causing the modulation recording unit ex402, the demodulation reproducing unit ex403, and the survo control unit ex406 to operate in cooperation with one another and using various pieces of information held in the buffer ex404 and generating/adding new information as needed. The system control unit ex407 includes, for example, a microprocessor and performs these processes by executing a read/write program.

Although the optical head ex401 that irradiates the recording surface with a laser spot has been described above, the optical head ex401 may include a configuration for performing high-density recording using near field light.

Figure 14:
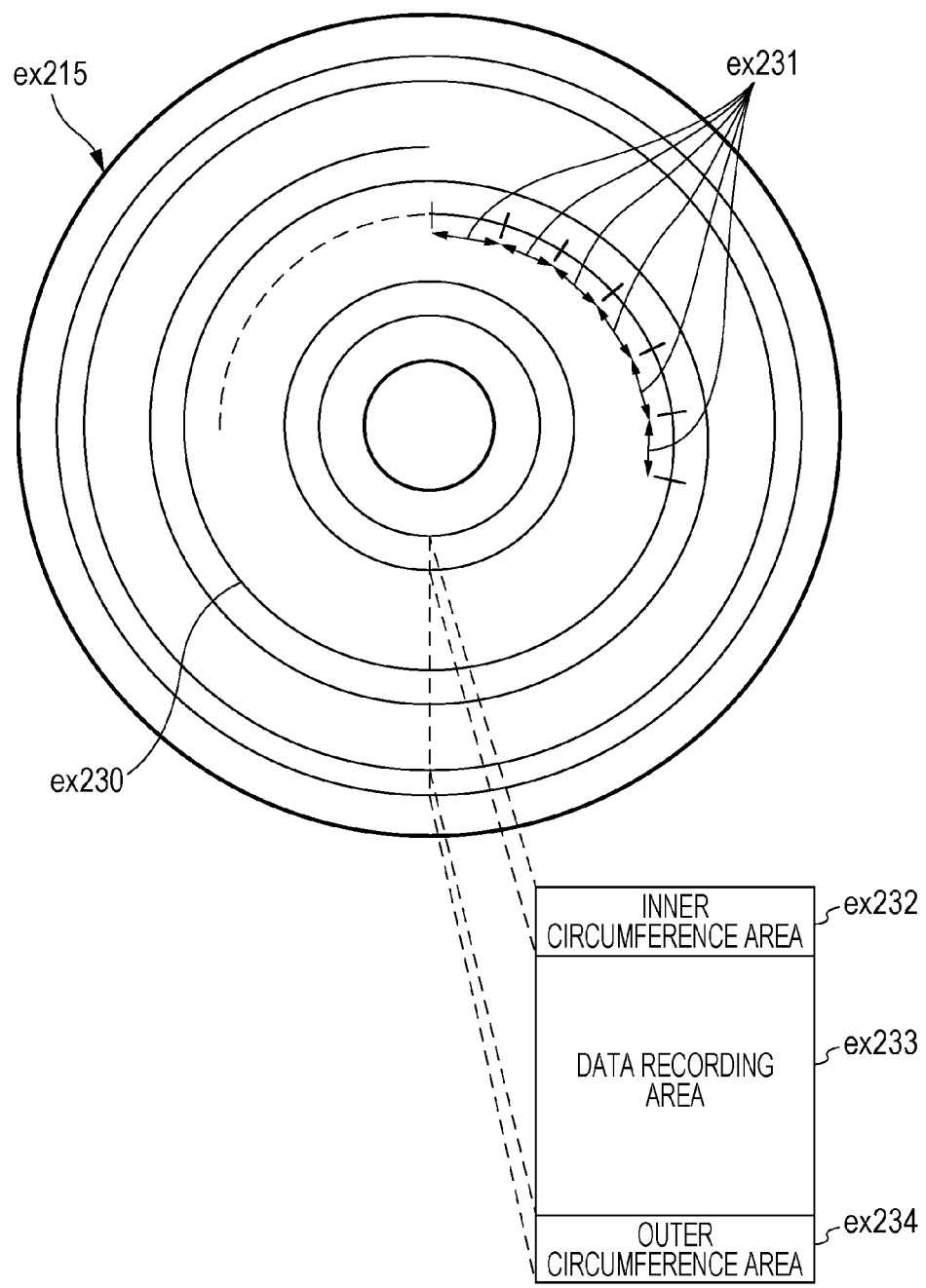
FIG. 14 is a diagram illustrating an example of a structure of an optical disc recording medium.

FIG. 14 is a schematic diagram of the recording medium ex215 which is an optical disc. On the recording surface of the recording medium ex215, a guide groove (groove) is spirally formed. In an information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing the information track ex230 and reading the address information. Also, the recording medium ex215 includes a data recording area ex233, an inner circumference area ex232, and an outer circumference area ex234. The data recording area ex233 is an area used for recording user data. The inner circumference area ex232 and the outer circumference area ex234 that are located on the inner side and the outer side of the data recording area ex233, respectively, are used for purposes other than recording of user data. The information reproducing/recording unit ex400 performs reading/writing of coded audio data, coded video data, or multiplexed data of these pieces of data on the data recording area ex233 of the recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multi-dimensional recording/reproduction can be performed by recording information at the same position of the disc using light of various waveforms different from one another, by recording information on different layers at various angles, or the like.

In addition, in the digital broadcasting system ex200, data may be received by a vehicle ex210 equipped with an antenna ex205 from the broadcasting satellite ex202 or the like and a moving image may be reproduced on a display device of a car navigation system ex211 mounted on the vehicle ex210. Note that the configuration illustrated in FIG. 12 additionally including a GPS reception unit is conceivable as the configuration of the car navigation system ex211, and the same applies to the computer ex111, the mobile phone ex114, or the like.

Figure 15A:
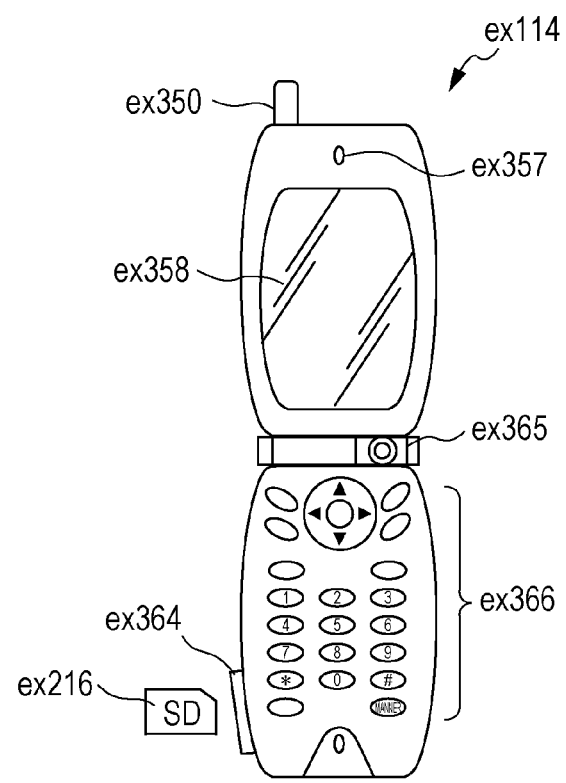
FIG. 15A is a diagram illustrating an example of a mobile phone.

FIG. 15A is a diagram illustrating the mobile phone ex114 that employs the video decoding method and the video coding method described in the above embodiment. The mobile phone ex114 includes an antenna ex350 that transmits and receives a radio wave to and from the base station ex110; a camera unit ex365 capable of capturing video and still images; and a display unit ex358, such as a liquid crystal display, that displays the video captured by the camera unit ex365 and data obtained by decoding video or the like received with the antenna ex350. The mobile phone ex114 further includes a body including an operation key unit ex366; an audio output unit ex357 such as a speaker for outputting audio; an audio input unit ex356 such as a microphone for inputting audio; a memory unit ex367 that stores coded data or decoded data of captured video, captured still images, recorded audio, received video, received still images, or received emails; and a slot unit ex364 which is an interface to a recording medium which similarly stores data thereon.

Figure 15B:
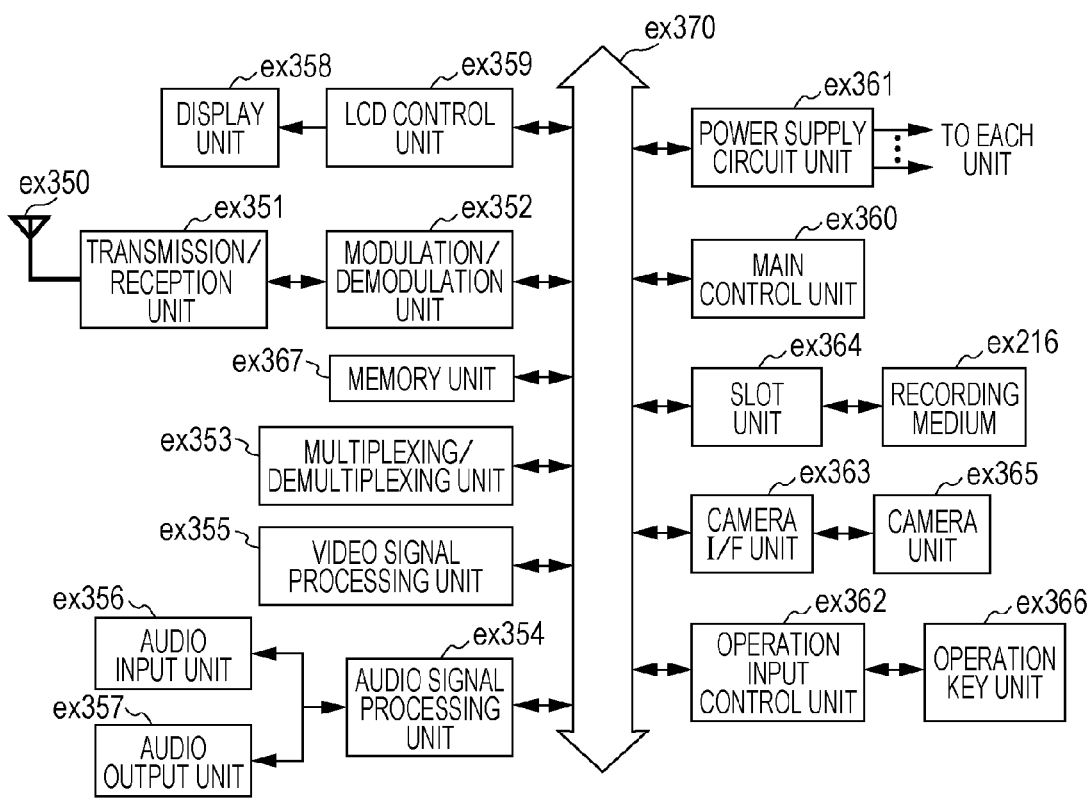
FIG. 15B is a block diagram illustrating an example of a configuration of the mobile phone.

Further, an example of a configuration of the mobile phone ex114 will be described with reference to FIG. 15B. The mobile phone ex114 includes a main control unit ex360 that controls individual units of the body which includes the display unit ex358 and the operation key unit ex366 in an integrated manner. The mobile phone ex114 also includes a power supply circuit unit ex361, an operation input control unit ex362, a video signal processing unit ex355, a camera interface unit ex363, an LCD (Liquid Crystal Display) control unit ex359, a modulation/demodulation unit ex352, a multiplexing/demultiplexing unit ex353, an audio signal processing unit ex354, the slot unit ex364, and the memory unit ex367 which are connected to the main control unit ex360 via a bus ex370.

When an on-hook/power key is turned on through a user operation, the power supply circuit unit ex361 supplies electric power to individual units from a battery pack to activate the mobile phone ex114 into an operable state.

In the mobile phone ex114, in a voice call mode, the audio signal processing unit ex354 converts an audio signal obtained by the audio input unit ex356 into a digital audio signal, the modulation/demodulation unit ex352 performs spread spectrum processing on this digital audio signal, and a transmission/reception unit ex351 performs digital-to-analog conversion processing and frequency conversion processing on this signal and then transmits the resulting signal via the antenna ex350 in accordance with control performed by the main control unit ex360 which includes a CPU, a ROM, and a RAM. Also, in the mobile phone ex114, in the voice call mode, the transmission/reception unit ex351 amplifies reception data received via the antenna ex350 and performs frequency conversion processing and analog-to-digital conversion processing, the modulation/demodulation unit ex352 performs spread spectrum processing on the resulting signal, the audio signal processing unit ex354 converts the resulting signal into an analog audio signal. The analog audio signal is then output from the audio output unit ex357.

In the case where an email is transmitted in a data communication mode, text data of the email input through operation of the operation key unit ex366 of the body or the like is sent to the main control unit ex360 via the operation input control unit ex362. The main control unit ex360 performs control such that the modulation/demodulation unit ex352 performs spread spectrum processing on the text data and the transmission/reception unit ex351 performs digital-to-analog conversion processing and frequency conversion processing on the text data and then transmits the resulting text data to the base station ex110 via the antenna ex350. In the case of receiving an email, substantially the opposite processing is performed on the received data, and the resulting text data is output to the display unit ex358.

In the case where video, a still image, or a combination of video and audio are transmitted in the data communication mode, the video signal processing unit ex355 compresses and codes a video signal supplied from the camera unit ex365 by using the video coding method described in the above embodiment (that is, the video signal processing unit ex355 functions as the image coding apparatus according to one aspect of the present disclosure), and sends the coded video data to the multiplexing/demultiplexing unit ex353. Also, the audio signal processing unit ex354 codes an audio signal obtained by the audio input unit ex356 while the video, still image, or the like is being captured by the camera unit ex365, and sends the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354 in accordance with a certain scheme. The modulation/demodulation unit (modulation/demodulation circuit unit) ex352 performs spread spectrum processing on the resulting multiplexed data. The transmission/reception unit ex351 performs digital-to-analog conversion processing and frequency conversion processing on the multiplexed data, and then transmits the resulting data via the antenna ex350.

In the case of receiving data of a moving image file linked to a web site or the like or an email attached with video or audio in the data communication mode, the multiplexing/demultiplexing unit ex353 demultiplexes multiplexed data into a bitstream of video data and a bitstream of audio data in order to decode the multiplexed data received via the antenna ex350. The multiplexing/demultiplexing unit ex353 supplies the coded video data to the video signal processing unit ex355 and the coded audio data to the audio signal processing unit ex354 via the synchronization bus ex370. The video signal processing unit ex355 performs decoding using a video decoding method corresponding to the video coding method described in the above embodiment to decode the video signal (that is, the video signal processing unit ex355 functions as the image decoding apparatus according to one aspect of the present disclosure). Then, for example, video or still image included in the moving image file linked to the website is displayed on the display unit ex358 via the LCD control unit ex359. Also, the audio signal processing unit ex354 decodes the audio signal, and the resulting audio is output by the audio output unit ex357.

Like the television ex300, three implementation forms, that is, a transmission/reception terminal including both an encoder and a decoder, a transmission terminal only including an encoder, and a reception terminal only including a decoder, are conceivable for a terminal such as the mobile phone ex114. Further, the case has been described in which multiplexed data in which video data, audio data, and so forth are multiplexed is received and transmitted in the digital broadcasting system ex200; however, the multiplexed data may be data in which text data related to the video is multiplexed other than audio data or video data alone may be used instead of the multiplexed data.

As described above, the video coding method or the video decoding method described in the above embodiment is applicable to any of the aforementioned devices and systems. In such a way, advantages described in the above embodiment can be obtained.

Also, the present disclosure is not limited to the embodiment above, and various modifications and corrections can be made without departing from the scope of the present disclosure.

Third Exemplary Embodiment

Video data can also be generated by switching between the video coding method or apparatus described in each of the above embodiments and a video coding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video coding method or apparatus described in each of the above embodiments will be described below. Multiplexed data is a digital stream in the MPEG-2 transport stream formant.

FIG. 16 is a diagram illustrating a structure of multiplexed data. As illustrated in FIG. 16, multiplexed data is obtained by multiplexing one or more of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing GUI components on the window. The video stream is coded using the video coding method or apparatus described in each of the above embodiments and using the video coding method or apparatus compliant with an existing standard, such as MPEG-2, MPEG-4 AVC, or VC-1. The audio stream is coded using a standard, such as Dolby AC-3 (Audio Code number 3), Dolby Digital Plus, MLP (Meridian Lossless Packing), DTS (Digital Theater Systems), DTS-HD, or linear PCM (Pulse Code Modulation).

Each stream included in multiplexed data is identified by a PID (Packet Identifier). For example, a video stream to be used as video of a movie is assigned 0x1011. An audio stream is assigned any one of 0x1100 to 0x111F. A presentation graphics stream is assigned any one of 0x1200 to 0x121F. An interactive graphics stream is assigned any one of 0x1400 to 0x141F. A video stream to be used as sub video of the movie is assigned any one of 0x1B00 to 0x1B1F. An audio stream to be used as sub audio to be mixed with main audio is assigned any one of 0x1A00 to 0x1A1F.

Figure 17:
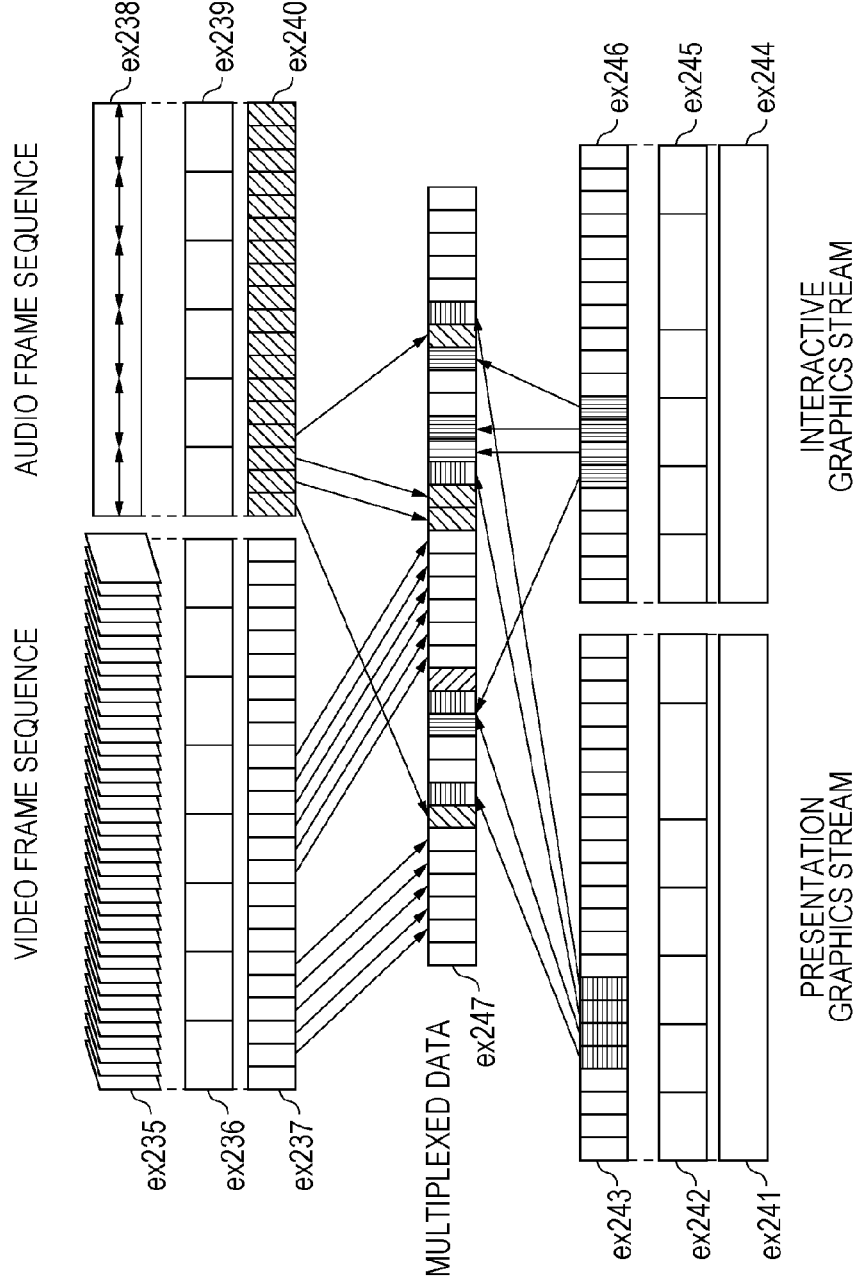
FIG. 17 is a diagram schematically illustrating how individual streams are multiplexed into multiplexed data.

FIG. 17 is a diagram schematically illustrating how individual streams are multiplexed into multiplexed data. A video stream ex235 made up of a plurality of video frames and an audio stream ex238 made up of a plurality of audio frames are converted into PES (Packetized Elementary Stream) packet sequences ex236 and ex239, and then into TS (Transport Stream) packets ex237 and ex240, respectively. Likewise, data of a presentation graphics stream ex241 and data of an interactive graphics stream ex244 are converted into PES packet sequences ex242 and ex245, and further into TS packets ex243 and ex246, respectively. Multiplexed data ex247 is formed by multiplexing these TS packets into one stream.

Figure 18:
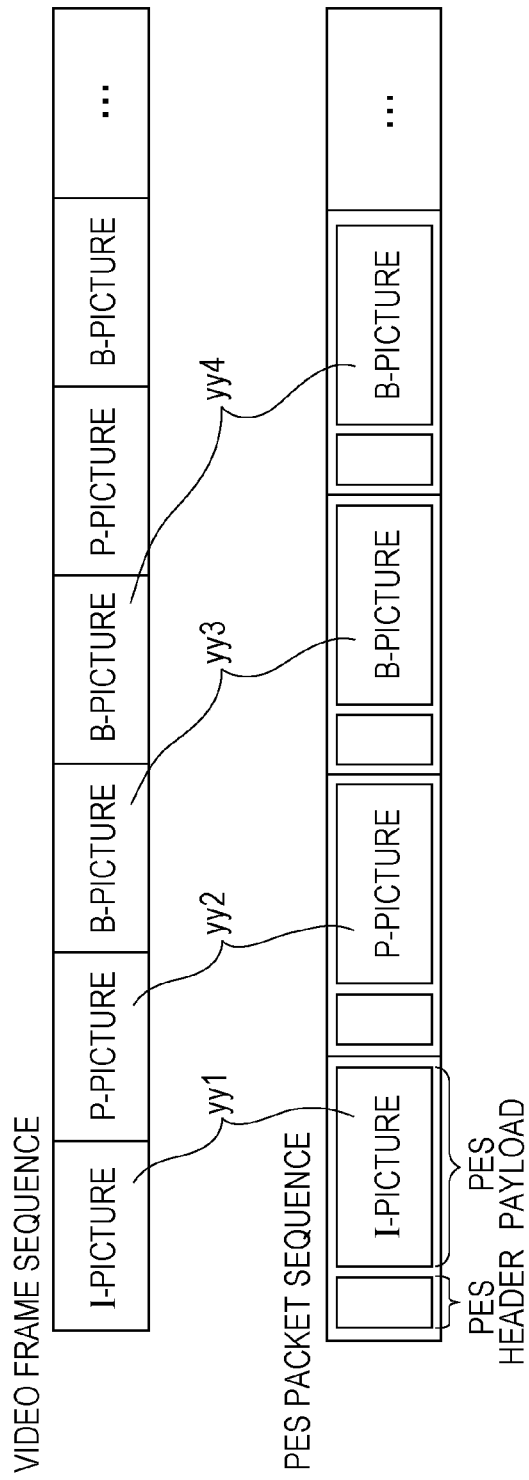
FIG. 18 is a diagram illustrating how a video stream is stored in a PES (Packetized Elementary Stream) packet sequence in a more detailed manner.

FIG. 18 illustrates how a video stream is stored in a PES packet sequence in detail. The upper row in FIG. 18 illustrates a video frame sequence of the video stream. The lower row illustrates a PES packet sequence. As denoted by arrows yy1, yy2, yy3, and yy4 in FIG. 18, I (intra)-pictures, B (bidirectional)-pictures, and P (predicted)-pictures which are a plurality of video presentation units in a video stream are separated on a picture-by-picture basis, and are stored in the payload of respective PES packets. Each PES packet includes a PES header in which PTS (Presentation Time-Stamp) that represents display time of the picture and DTS (Decoding Time-Stamp) that represents decoding time of the picture are stored.

FIG. 19 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as ATS (Arrival_Time_Stamp). The ATS represents the transfer start time at which transfer of the TS packet to a PID filter of a decoder is to be started. As illustrated by the lowest row in FIG. 19, source packets are arranged in the multiplexed data. The number that is incremented from the start of the multiplexed data is called SPN (Source Packet Number).

TS packets included in the multiplexed data include a PAT (Program Association Table), a PMT (Program Map Table), and a PCR (Program Clock Reference) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding STC (System Time Clock) time corresponding to the ATS at which the PCR packet is transferred to a decoder in order to achieve synchronization between ATC (Arrival Time Clock) which is the time axis for ATS and STC (System Time Clock) which is the time axis for PTS and DTS.

Figure 20:
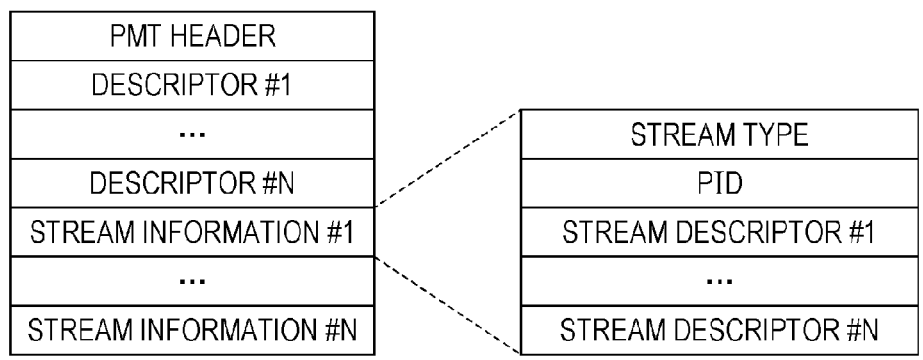
FIG. 20 is a diagram illustrating a data structure of a PMT (Program Map Table)

FIG. 20 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 21:
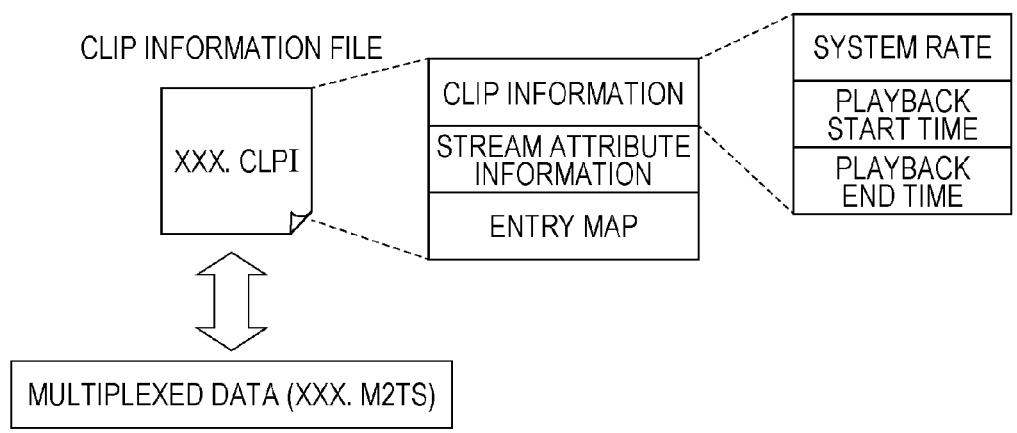
FIG. 21 is a diagram illustrating an internal structure of multiplexed data information.

As illustrated in FIG. 21, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 21. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

For each PID, attribute information of a corresponding stream included in the multiplexed data is registered in the stream attribute information as illustrated in FIG. 22. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the third embodiment, the stream type contained in the PMT is used among the multiplexed data. Also, in the case where the multiplexed data is recorded on a recording medium, the video stream attribute information contained in the multiplexed data information is used. Specifically, the video coding method or apparatus described in each of the above embodiments includes a step or unit for setting unique information which indicates whether or not this video data has been generated by the video coding method or apparatus described in each of the above embodiments, in the stream type contained in the PMT or the video stream attribute information. With this configuration, video data generated using the video coding method or apparatus described in each of the above embodiments and video data based on another standard can be distinguished from each other.

FIG. 23 illustrates steps included in a video decoding method in accordance with the third embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video coding method or apparatus described in each of the above embodiments. If it is determined from the stream type or the video stream attribute information that this multiplexed data has been generated using the video coding method or apparatus described in each of the above embodiments, decoding is performed using the video decoding method described in each of the above embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the steam type or the video stream attribute information in this way, it can be determined whether or not decoding can be performed using the video decoding method or apparatus described in each of the above embodiments at the time of decoding. Accordingly, even in the case where multiplexed data based on a different standard is input, an appropriate decoding method or apparatus can be selected, and thus decoding can be performed without causing an error. Also, the video coding method or apparatus or the video decoding method or apparatus described in the third embodiment is applicable to any of the aforementioned devices and systems.

Fourth Exemplary Embodiment

Figure 24:
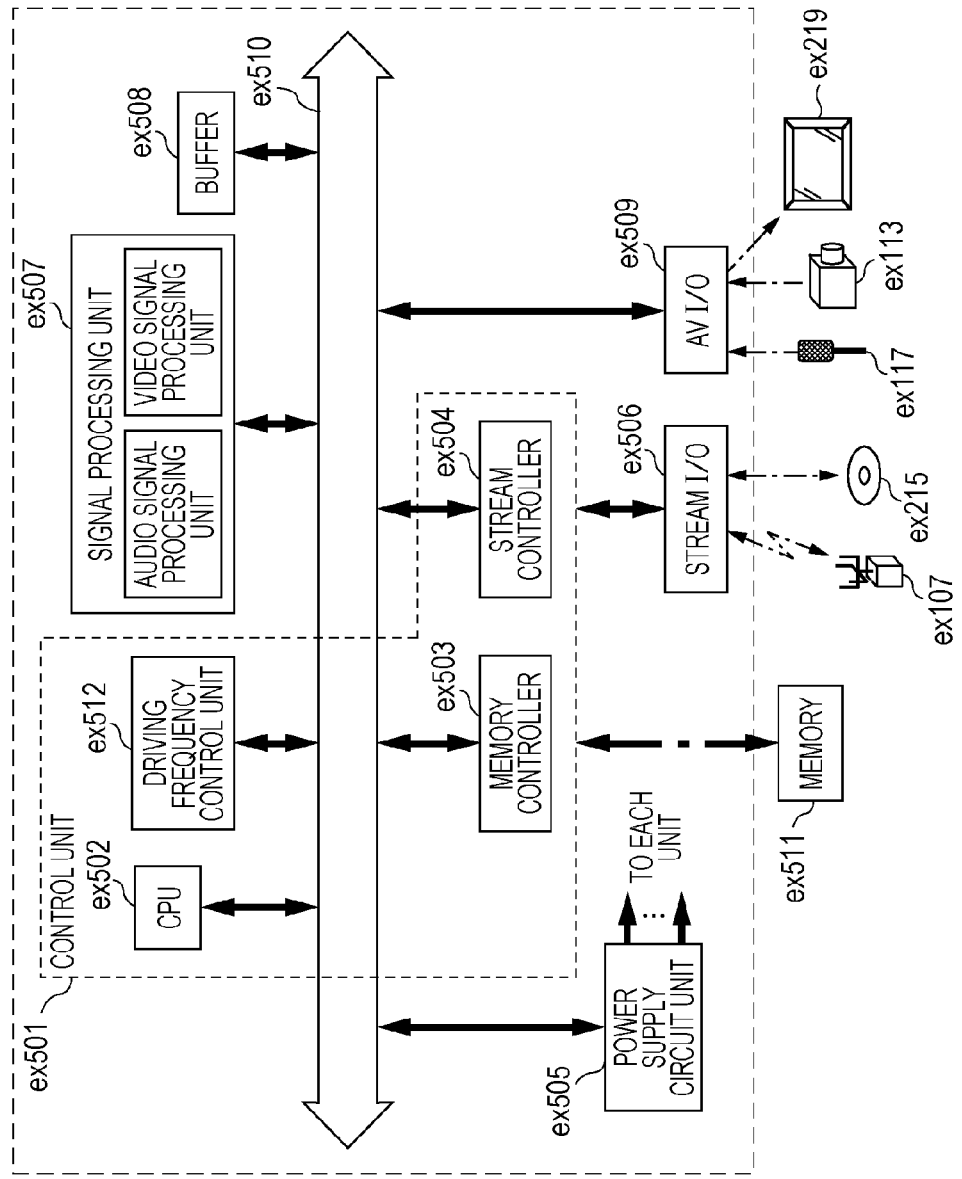
FIG. 24 is a block diagram illustrating an example of a configuration of an integrated circuit that implements an image coding method and an image decoding method according to each of the embodiments.

The video coding method and apparatus and the video decoding method and apparatus described in each of the above embodiments are typically implemented using an LSI which is an integrated circuit. FIG. 24 illustrates an example of a configuration of the LSI ex500 which is formed as one chip. The LSI ex500 includes a control unit ex501, a CPU ex502, a memory controller ex503, a stream controller ex504, a power supply circuit unit ex505, a stream input/output (I/O) ex506, a signal processing unit ex507, a buffer ex508, and an audio/video (AV) I/O ex509, which are connected to one another via a bus ex510. Upon power-on, the power supply circuit unit ex505 supplies electric power to the individual units to activate the individual units into an operable state.

For example, in the case of performing a coding process, the LSI ex500 receives an AV signal from a microphone ex117, the camera ex113, or the like via the AV I/O ex509 in accordance with control performed by the control unit ex501 which includes the CPU ex502, the memory controller ex503, the stream controller ex504, and a driving frequency control unit ex512. The input AV signal is temporarily stored in an external memory ex511, such as an SDRAM (Synchronous Dynamic Random Access Memory). In accordance with control performed by the control unit ex501, the stored data is divided into a plurality of portions in accordance with an amount of processing or a processing speed, and the plurality of portions are sent to the signal processing unit ex507. Then, the signal processing unit ex507 codes the audio signal and/or the video signal. The coding process performed on the video signal here is the coding process described in each of the above embodiments. The signal processing unit ex507 performs processing such as multiplexing of the coded audio data and the coded video data depending on circumstances, and outputs the multiplexed data to outside via the stream I/O ex506. This output multiplexed data is transmitted to the base station ex107 or written to the recording medium ex215. Note that the audio data and the video data may be temporarily stored in the buffer ex508 at the time of multiplexing so that these pieces of data are synchronized with each other.

Note that although the memory ex511 has been described as a device provided outside the LSI ex500 above, the memory ex511 may be included in the LSI ex500. The number of buffers ex508 is not limited to one and the LSI ex500 may include a plurality of buffers. Also, the LSI ex500 may be formed as a single chip or a plurality of chips.

Although the control unit ex501 includes the CPU ex502, the memory controller ex503, the stream controller ex504, and the driving frequency control unit ex512 above, the configuration of the control unit ex501 is not limited to this one. For example, the signal processing unit ex507 may further include a CPU. By providing a CPU within the signal processing unit ex507, the processing speed can be further improved. Alternatively, the CPU ex502 may include the signal processing unit ex507 or, for example, an audio signal processing unit which is part of the signal processing unit ex507. In such a case, the control unit ex501 includes the CPU ex502 which includes the signal processing unit ex507 or part of the signal processing unit ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used.

Furthermore, if an advance in the semiconductor technology or another related technology yields a circuit integration technology that may substitute for LSI, the functional blocks may be integrated using such a technology obviously. Adaptation of the biotechnology may be possible.

Fifth Exemplary Embodiment

It is considered that an amount of processing increases in the case of decoding video data generated using the video coding method or apparatus described in each of the above embodiments, compared with the case of decoding video data based on an existing standard, such as MPEG-2, MPEG-4 AVC, or VC-1. Accordingly, in the LSI ex500, a higher driving frequency needs to be set in the CPU ex502 than that used when video data based on an existing standard is decoded. However, making the driving frequency higher undesirably increases power consumption.

Figure 25:
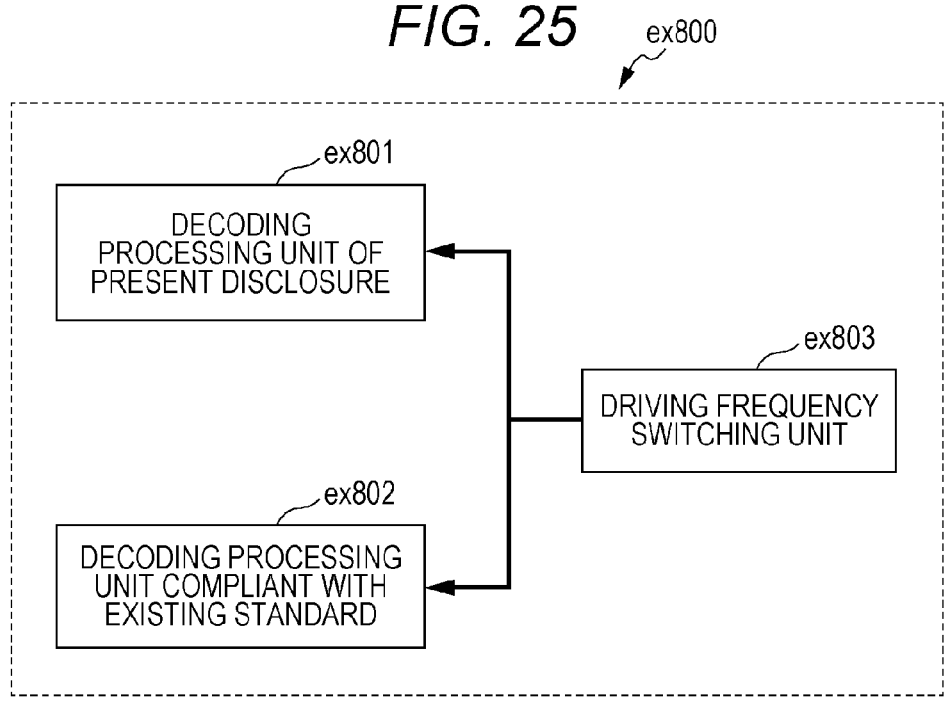
FIG. 25 is a diagram illustrating a configuration for switching between driving frequencies.

To address this issue, the video decoding apparatus, such as the television ex300 or the LSI ex500, is configured to identify a standard which video data is based on, and to switch between the driving frequencies in accordance with the standard. FIG. 25 illustrates a configuration ex800 in accordance with the fifth embodiment. A driving frequency switching unit ex803 sets the driving frequency high in the case where video data is data that has been generated using the video coding method or apparatus described in each of the above embodiments. The driving frequency switching unit ex803 also instructs a decoding processing unit ex801 which executes the video decoding method described in each of the above embodiments to decode the video data. On the other hand, in the case where the video data is data based on an existing standard, the driving frequency switching unit ex803 sets the driving frequency lower than that of the case where the video data is data that has been generated using the video coding method or apparatus described in each of the above embodiments. Then, the driving frequency switching unit ex803 instructs a decoding processing unit ex802 compliant with the existing standard to decode the video data.

Figures 27, 28A:
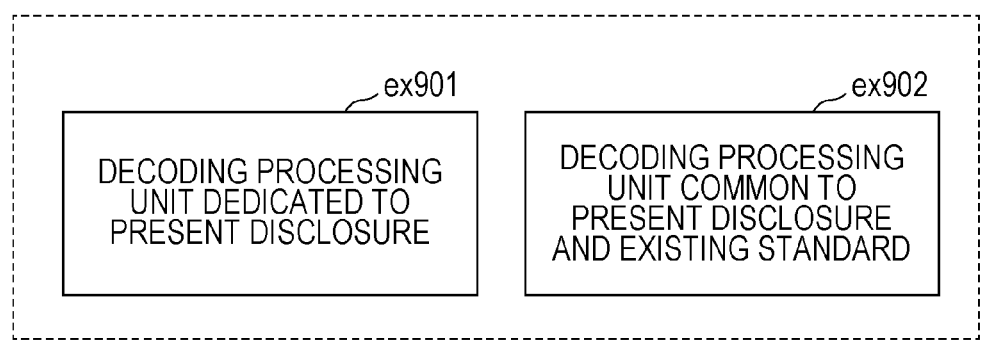
FIG. 27 is a diagram illustrating an example of a lookup table in which a video data standard and a driving frequency are associated with each other.
FIG. 28A is a diagram illustrating an example of a configuration that enables sharing of modules among signal processing units.

More specifically, the driving frequency switching unit ex803 includes the CPU ex502 and the driving frequency control unit ex512 illustrated in FIG. 24. The decoding processing unit ex801 that executes the video decoding method described in each of the above embodiments and the decoding processing unit ex802 compliant with an existing standard correspond to the signal processing unit ex507 illustrated in FIG. 24. The CPU ex502 identifies a standard which video data is based on. Then, based on a signal from the CPU ex502, the driving frequency control unit ex512 sets the driving frequency. Also, based on a signal from the CPU ex502, the signal processing unit ex507 decodes the video data. Here, the use of the identification information described in the third embodiment, for example, in identification of the video data is conceivable. The identification information is not limited to the one described in the third embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of the CPU ex502 in accordance with a lookup table in which the standard for the video data and the driving frequency are associated with each other as illustrated in FIG. 27, for example. The lookup table is stored in the buffer ex508 or an internal memory of the LSI ex500, and the CPU ex502 refers to this lookup table. In this way, the driving frequency can be selected.

Figure 26:
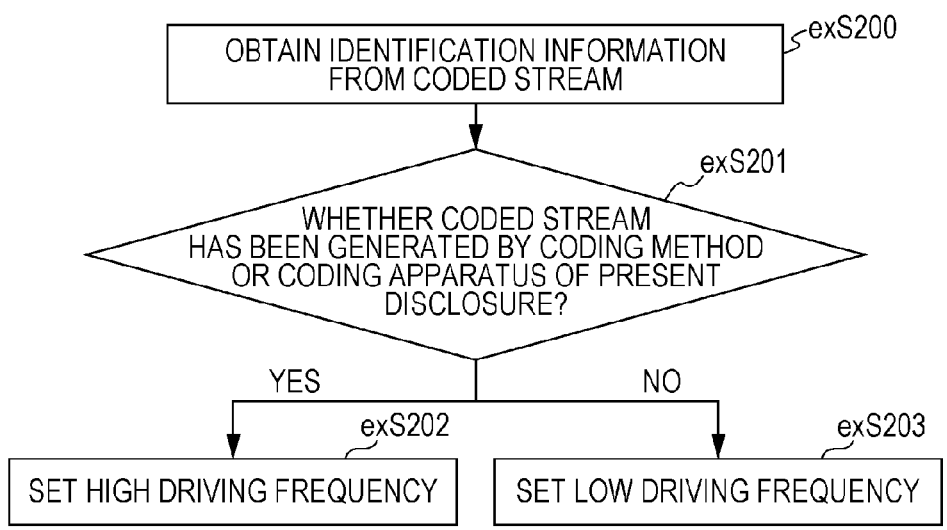
FIG. 26 is a diagram illustrating steps for identifying video data and switching between driving frequencies.

FIG. 26 illustrates steps for performing the method according to the fifth embodiment. First, in step exS200, the signal processing unit ex507 obtains identification information from multiplexed data. Then, in step exS201, based on the identification information, the CPU ex502 identifies whether or not video data is video data that has been generated using the video coding method or apparatus described in each of the above embodiments. If the video data is video data that has been generated using the video coding method or apparatus described in each of the above embodiments, the CPU ex502 sends a signal for setting a high driving frequency to the driving frequency control unit ex512 in step exS202. Then, the driving frequency control unit ex512 sets a high driving frequency. On the other hand, if the identification information indicates that the video data is video data based on an existing standard, such as MPEG-2, MPEG-4 AVC, or VC-1, the CPU ex502 sends a signal for setting a low driving frequency to the driving frequency control unit ex512 in step exS203. Then, the driving frequency control unit ex512 sets a lower driving frequency than that used when the video data is video data that has been generated using the video coding method or apparatus described in each of the above embodiments.

Further, by changing a voltage supplied to the LSI ex500 or an apparatus including the LSI ex500 in conjunction with switching of the driving frequency, the power-saving effect can be further increased. For example, it is conceivable that in the case where a low driving frequency is set, a voltage supplied to the LSI ex500 or an apparatus including the LSI ex500 is set to be lower in response to this setting than that of the case where a high driving frequency is set.

It is sufficient that the driving frequency is set to be higher in the case where an amount of decoding processing is large and set to be lower in the case where an amount of decoding processing is small. Accordingly, the driving frequency setting method is not limited to the above-described setting method. For example, in the case where an amount of processing for decoding video data based on the MPEG-4 AVC standard is larger than an amount of processing for decoding video data generated using the video coding method or apparatus described in each of the above embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video coding method or apparatus described in each of the above embodiments, a voltage supplied to the LSI ex500 or an apparatus including the LSI ex500 may be set to be high. In the case where the identification information indicates that the video data is video data based on an existing standard, such as MPEG-2, MPEG-4 AVC, or VC-1, a voltage supplied to the LSI ex500 or an apparatus including the LSIex500 may be set to be low. Alternatively, in another example, in the case where the identification information indicates that the video data is video data that has been generated using the video coding method or apparatus described in each of the above embodiments, driving of the CPU ex502 is not stopped. In the case where the identification information indicates that the video data is video data based on an existing standard, such as MPEG-2, MPEG-4 AVC, or VC-1, driving of the CPU ex502 may be temporarily stopped because there is a surplus of capacity relative to the processing load. When there is a surplus of capacity relative to the processing load in the case where the identification information indicates that the video data is video data that has been generated using the video coding method or apparatus described in each of the above embodiments, driving of the CPU ex502 may be temporarily stopped. In this case, a period over which the CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where the LSI ex500 or an apparatus including the LSI ex500 is driven with a battery, the battery can be made last longer as a result of power-saving.

Sixth Exemplary Embodiment

A plurality of pieces of video data based on different standards are sometimes input to the aforementioned devices and systems, such as the television ex300 and the mobile phone ex114. In order to enable decoding even in the case where a plurality of pieces of video data based on different standards are input, the signal processing unit ex507 of the LSI ex500 needs to support the plurality of standards. However, the use of the signal processing units ex507 for the respective standards undesirably makes the circuit scale of the LSI ex500 larger and increases the cost.

To address this issue, a decoding processing unit that executes the video decoding method described in each of the above embodiments and a decoding processing unit compliant with an existing standard, such as MPEG-2, MPEG-4 AVC, or VC-1, share some of their components. FIG. 28A illustrates an example of this configuration ex900. For example, the video decoding method described in each of the above embodiments and the video decoding method compliant with the MPEG-4 AVC standard share some of contents of processing, such as entropy decoding, inverse quantization, deblocking filtering, and motion compensation. Accordingly, the following configuration is conceivable. For the shared processing contents, a decoding processing unit ex902 compliant with the MPEG-4 AVC standard in used in common. For other processing contents that are not compliant with the MPEG-4 AVC standard and are unique to an aspect of the present disclosure, a dedicated decoding processing unit ex901 may be used. Alternatively, as for sharing of the decoding processing unit, a configuration may be used in which a decoding processing unit that executes the video decoding method described in each of the above embodiments is used for the common processing contents and a dedicated decoding processing unit is used for processing contents unique to the MPEG-4 AVC standard.

Figure 28B:
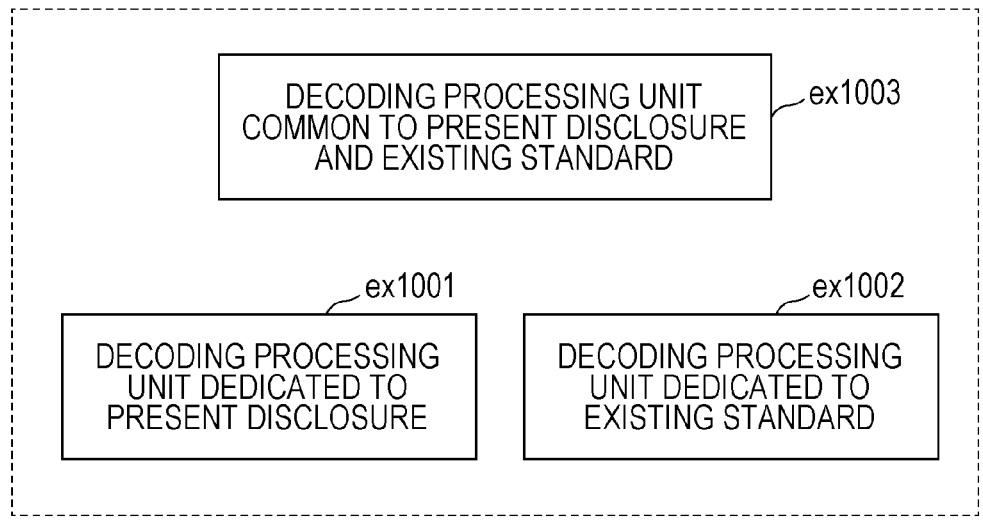
FIG. 28B is a diagram illustrating another example of a configuration that enables sharing of modules among signal processing units.

FIG. 28B illustrates another example ex1000 that implements sharing of part of processing. In this example, a dedicated decoding processing unit ex1001 that handles processing contents unique to an aspect of the present disclosure, a dedicated decoding processing unit ex1002 that handles processing contents unique to an existing standard, and a shared decoding processing unit ex1003 that handles processing contents that are common to the video decoding method according to the aspect of the present disclosure and the video decoding method according to the existing standard are used. Here, the dedicated decoding processing units ex1001 and ex1002 are not necessarily specialized for the processing contents unique to the aspect of the present disclosure and the existing standard, respectively, and may be also capable of executing other general processing. Also, the configuration according to the sixth embodiment can be implemented using the LSI ex500.

By sharing a decoding processing unit for processing contents that are common to the video decoding method according to an aspect of the present disclosure and the video decoding method according to an existing standard, the circuit scale and cost of the LSI ex500 can be reduced.

INDUSTRIAL APPLICABILITY

The present disclosure is used advantageously in an image coding apparatus or an image coding method.

What is claimed is:

1. An image coding method for coding a block in an image on a block-by-block basis, comprising:
   determining a coding unit size of a coding unit in the block, a transform unit size of a transform unit in the block, and a prediction unit size of a prediction unit in the block;
   predicting the block, on each prediction unit, to generate a prediction block;
   transforming a difference between the block and the prediction block to residual data, on each transform unit; and
   coding the residual data on each coding unit to generate a bitstream,
   wherein a minimum coding unit size is 8×8, and both a minimum transform unit size and a minimum prediction unit size are 4×4,
   wherein when the transform unit size is set as the minimum coding unit size, both the transform unit size and the prediction unit size are the minimum coding unit size, the transform unit size is not the minimum transform unit size, and the prediction unit size is not the minimum prediction unit size, and
   wherein when the transform unit size is not set as the minimum coding unit size, both the transform unit size and the prediction unit size are not always the same minimum coding unit size.

2. An image coding method for coding a block in an image on a block-by-block basis, comprising:
   determining a first size of a first unit for coding the block, a second size of a second unit for transforming the block, and a third size of a third unit for predicting the block;
   predicting the block on each third unit to generate a prediction block;
   transforming a difference between the block and the prediction block to residual data, on each second unit; and
   coding the residual data on each first unit to generate a bitstream,
   wherein a minimum first unit size is 8×8, and both a minimum second unit size and a minimum third unit size are 4×4,
   wherein when the second size is set as a same size as the minimum first unit size, both the second size and the third size are the minimum first unit size, the second size is not the minimum second unit size, and the third unit size is not the minimum third unit size, and
   wherein when the transform unit size is not set as the minimum coding unit size, both the transform unit size and the prediction unit size are not always the same minimum coding unit size.

* * * * *